US007315816B2

(12) United States Patent
Gotanda et al.

(10) Patent No.: US 7,315,816 B2
(45) Date of Patent: Jan. 1, 2008

(54) RECOVERING METHOD OF TARGET SPEECH BASED ON SPLIT SPECTRA USING SOUND SOURCES' LOCATIONAL INFORMATION

(75) Inventors: Hiromu Gotanda, Iizuka (JP); Kazuyuki Nobu, Iizuka (JP); Takeshi Koya, Iizuka (JP); Keiichi Kaneda, Iizuka (JP); Takaaki Ishibashi, Iizuka (JP)

(73) Assignee: Zaidanhouzin Kitakyushu Sangyou Gakujutsu Suishin Kikou, Fukuoka-Ken (JP)

( * ) Notice: Subject to any disclaimer, the term of this patent is extended or adjusted under 35 U.S.C. 154(b) by 965 days.

(21) Appl. No.: 10/435,135

(22) Filed: May 9, 2003

(65) Prior Publication Data

US 2004/0040621 A1 Mar. 4, 2004

(30) Foreign Application Priority Data

May 10, 2002 (JP) ............................ 2002-135772
Apr. 22, 2003 (JP) ............................ 2003-117458

(51) Int. Cl.
*G10L 21/02* (2006.01)
*G10L 15/20* (2006.01)
*H04B 1/10* (2006.01)

(52) U.S. Cl. ....................... 704/226; 704/233; 702/196

(58) Field of Classification Search ........ 704/205–207, 704/224–226, 200, 233; 381/94.7
See application file for complete search history.

(56) References Cited

U.S. PATENT DOCUMENTS 6,879,952 B2 * 4/2005 Acero et al. ................ 704/222
7,020,294 B2 * 3/2006 Lee et al. .................. 381/94.7
2001/0037195 A1 * 11/2001 Acero et al. ................ 704/200

FOREIGN PATENT DOCUMENTS

JP H10-313497 11/1998

OTHER PUBLICATIONS

Cichicki et al., Robust learning algorithm for blind separation of signals, Aug. 18, 1994, Electronics Letters, Vol. 30, Issue: 17, pp. 1386-1387.*

(Continued)

*Primary Examiner*—David Hudspeth
*Assistant Examiner*—Abdelali Serrou
(74) *Attorney, Agent, or Firm*—Konomi Takeshita

(57) ABSTRACT

The present invention relates to a method for recovering target speech from mixed signals, which include the target speech and noise observed in a real-world environment, based on split spectra using sound sources' locational information. This method includes: the first step of receiving target speech from a target speech source and noise from a noise source and forming mixed signals of the target speech and the noise at a first microphone and at a second microphone; the second step of performing the Fourier transform of the mixed signals from a time domain to a frequency domain, decomposing the mixed signals into two separated signals $U_A$ and $U_B$ by use of the Independent Component Analysis, and, based on transmission path characteristics of the four different paths from the target speech source and the noise source to the first and second microphones, generating from the separated signal $U_A$ a pair of split spectra $v_{A1}$ and $v_{A2}$, which were received at the first and second microphones respectively, and from the separated signal $U_B$ another pair of split spectra $v_{B1}$ and $v_{B2}$, which were received at the first and second microphones respectively; and the third step of extracting a recovered spectrum of the target speech, wherein the split spectra are analyzed by applying criteria based on sound transmission characteristics that depend on the four different distances between the first and second microphones and the target speech and noise sources, and performing the inverse Fourier transform of the recovered spectrum from the frequency domain to the time domain to recover the target speech.

10 Claims, 13 Drawing Sheets

OTHER PUBLICATIONS

Paris Smaragdis, Efficient blind separation of convolved sound mixtures, Oct. 19-22, 1997, Applications of Signal Processing to Audio and Acoustics, 1997. 1997 IEEE ASSP Workshop on, pp. 1-4.*

Ikram et al., Exploring permutation inconsistency in blind separation of speechsignals in a reverberant environment, Acoustics, Speech, and Signal Processing, 2000, Proceedings. 2000 IEEE International Conference Jun. 5, 2000-Jun. 9, 2000, Publication Date: 2000, vol. 2, pp. II1041-II1044.*

Saruwatari, Blind source separation combining frequency-domain ICA andbeamforming, Acoustics, Speech, and Signal Processing, 2001. Proceedings. (ICASSP '01). 2001 IEEE International Conference May 7, 2001-May 11, 2001, Publication Date: 2001, vol. 5, pp. 2733-2736.*

Noboru Murata, Shiro Ikeda, and Andreas Ziehe, An approach to blind source separation based on temporal structure of speech signals, NEUROCOMPUTING, Oct. 2001, pp. 1-24, vol. 41, Issue 1-4, Elsevier.

Shiro Ikeda and Noboru Murata, "A method of ICA in time-frequency domain," In Proceedings of International Workshop on Independent Component Analysis and Blind Signal Separation (ICA'99) , Jan. 1999, pp. 365-371, Aussions, France.

Yoshifumi Nagata et al, Target Signal Detection System Using Two Directional Microphones, Journal of the Institute of Electronics, Information, and Communication Engineers, Dec. 2000, pp. 1445-1454, vol. J83-A, Japan.

* cited by examiner (A)

(B)

(C)

(D)

(E)

(F)

(A)

(B)

(C)

(D)

(E)

(F)

RECOVERING METHOD OF TARGET SPEECH BASED ON SPLIT SPECTRA USING SOUND SOURCES' LOCATIONAL INFORMATION

CROSS REFERENCE TO RELATED APPLICATIONS

This application claims priority under 35 U.S.C. 119 based upon Japanese Patent Application Serial No. 2002-135772, filed on May 10, 2002, and Japanese Patent Application Serial No. 2003-117458, filed on Apr. 22, 2003. The entire disclosure of the aforesaid applications is incorporated herein by reference.

BACKGROUND OF THE INVENTION

1. Field of the Invention

The present invention relates to a method for extracting and recovering target speech from mixed signals, which include the target speech and noise observed in a real-world environment, by utilizing sound sources' locational information.

2. Description of the Related Art

Recently the speech recognition technology has significantly improved and achieved provision of speech recognition engine with extremely high recognition capabilities for the case of ideal environments, i.e. no surrounding noise. However, it is still difficult to attain a desirable recognition rate in a household environment or offices where there are sounds of daily activities and the like. In order to take advantage of the inherent capability of the speech recognition engine in such environments, pre-processing is needed to remove noises from the mixed signals and pass only the target speech such as a speaker's speech to the engine.

From the above aspect, the Independent Component Analysis (ICA) has been known to be a useful method. By use of this method, it is possible to separate the target speech from the observed mixed signals, which consist of the target speech and noises overlapping each other, without information on the transmission paths from individual sound sources, provided that the sound sources are statistically independent.

In fact, it is possible to completely separate individual sound signals in the time domain if the target speech and the noise are mixed instantaneously, although there exist some problems such as amplitude ambiguity (i.e., output amplitude differs from its original sound source amplitude) and permutation (i.e., the target speech and the noise are switched with each other in the output). In a real-world environment, however, mixed signals are observed with time lags due to microphones' different reception capabilities, or with sound convolution due to reflection and reverberation, making it difficult to separate the target speech from the noise in the time domain.

For the above reason, when there are time lags and sound convolution, the separation of the target speech from the noise in mixed signals is performed in the frequency domain after, for example, the Fourier transform of the time-domain signals to the frequency-domain signals (spectra). However, for the case of processing superposed signals in the frequency domain, the amplitude ambiguity and the permutation occur at each frequency. Therefore, without solving these problems, meaningful signals cannot be obtained by simply separating the target speech from the noise in the mixed signals in the frequency domain and performing the inverse Fourier transform to get the signals from the frequency domain back to the time domain.

In order to address these problems, several separation methods have been invented to date. Among them, the Fast ICA is characterized by its capability of sequentially separating signals from the mixed signals in descending order of non-Gaussianity. Since speech generally has higher non-Gaussianity than noises, it is expected that the permutation problem diminishes by first separating signals corresponding to the speech and then separating signals corresponding to the noise by use of this method.

Also, the amplitude ambiguity problem has been addressed by Ikeda et al. by the introduction of the split spectrum concept (see, for example, N. Murata, S. Ikeda and A. Ziehe, "An Approach To Blind Source Separation Based On Temporal Structure Of Speech Signals", Neurocomputing, vol. 41, Issue 1-4, pp. 1–24, 2001; S. Ikeda and N. Murata, "A Method Of ICA In Time Frequency Domain", Proc. ICA '99, pp. 365–371, Aussions, France, January 1999).

In order to address the permutation problem, additionally proposed is a method wherein estimated separation weights of adjacent frequencies are used for the initial values of separation weights. However, this method is not effective for the real-world environment due to its approach that is not based on a priori information. Also it is difficult to identify the target speech among separated output signals in this method; thus, a posteriori judgment is needed for the identification, slowing down the recognition process.

SUMMARY OF THE INVENTION

In view of the above situation, the objective of the present invention is to provide a method for recovering target speech based on split spectra using sound sources' locational information, which is capable of recovering the target speech with high clarity and little ambiguity from mixed signals including noises observed in a real-world environment.

In order to achieve the above objective, according to a first aspect of the present invention, there is provided a method for recovering target speech based on split spectra using sound sources' locational information, comprising: the first step of receiving target speech from a target speech source and noise from a noise source and forming mixed signals of the target speech and the noise at a first microphone and at a second microphone, which are provided at different locations; the second step of performing the Fourier transform of the mixed signals from a time domain to a frequency domain, decomposing the mixed signals into two separated signals $U_A$ and $U_B$ by use of the Independent Component Analysis, and, based on transmission path characteristics of the four different paths from the target speech source and the noise source to the first and second microphones, generating from the separated signal $U_A$ a pair of split spectra $v_{A1}$ and $v_{A2}$, which were received at the first and second microphones respectively, and from the separated signal $U_B$ another pair of split spectra $v_{B1}$ and $v_{B2}$, which were received at the first and second microphones respectively; and the third step of extracting a recovered spectrum of the target speech, wherein the split spectra are analyzed by applying criteria based on sound transmission characteristics that depend on the four different distances between the first and second microphones and the target speech and noise sources, and performing the inverse Fourier transform of the recovered spectrum from the frequency domain to the time domain to recover the target speech.

The first and second microphones are placed at different locations, and each microphone receives both the target speech and the noise from the target speech source and the noise source, respectively. In other words, each microphone receives a mixed signal, which consists of the target speech and the noise overlapping each other.

In general, the target speech and the noise are assumed statistically independent of each other. Therefore, if the mixed signals are decomposed into two independent signals by means of a statistical method, for example, the Independent Component Analysis, one of the two independent signals should correspond to the target speech and the other to the noise.

However, since the mixed signals are convoluted with sound reflections and time-lagged sounds reaching the microphones, it is difficult to decompose the mixed signals into the target speech and the noise as independent components in the time domain. For this reason, the Fourier transform is performed to convert the mixed signals from the time domain to the frequency domain, and they are decomposed into two separated signals $U_A$ and $U_B$ by means of the Independent Component Analysis.

Thereafter, by taking into account transmission path characteristics of the four different paths from the target speech and noise sources to the first and second microphones, a pair of split spectra $v_{A1}$ and $v_{A2}$, which were received at the first and second microphones respectively, are generated from the separated signal $U_A$. Also, from the separated signals $U_B$, another split spectra $v_{B1}$ and $v_{B2}$, which were received at the first and second microphones respectively, are generated.

Further, due to sound transmission characteristics that depend on the four different distances between the first and second microphones and the target speech and noise sources (for example, sound intensities), spectral intensities of the split spectra $v_{A1}$, $v_{A2}$, $v_{B1}$, and $v_{B2}$ differ from one another. Therefore, if distinctive distances are provided between the first and second microphones and the target speech and noise sources, it is possible to determine which microphone received which sound source's signal. That is, it is possible to identify the sound source for each of the split spectra $v_{A1}$, $v_{A2}$, $v_{B1}$, and $v_{B2}$. Thus, a spectrum corresponding to the target speech, which is selected from the split spectra $v_{A1}$, $v_{A2}$, $v_{B1}$, and $v_{B2}$, can be extracted as a recovered spectrum of the target speech.

Finally, by performing the inverse transform of the recovered spectrum from the frequency domain to the time domain, the target speech is recovered. In the present method, the amplitude ambiguity and permutation are prevented in the recovered target speech.

In the method according to a first modification of the first aspect of the present invention, if the target speech source is closer to the first microphone than to the second microphone and if the noise source is closer to the second microphone than to the first microphone, (i) a difference $D_A$ between the split spectra $v_{A1}$ and $v_{A2}$ and a difference $D_B$ between the split spectra $v_{B1}$ and $v_{B2}$ are calculated, and (ii) the criteria for extracting a recovered spectrum of the target speech comprise:

(1) if the difference $D_A$ is positive and if the difference $D_B$ is negative, the split spectrum $v_{A1}$ is extracted as the recovered spectrum of the target speech; or (2) if the difference $D_A$ is negative and if the difference $D_B$ is positive, the split spectrum $v_{B1}$ is extracted as the recovered spectrum of the target speech.

The above criteria can be explained as follows. First, if the target speech source is closer to the first microphone than to the second microphone, the gain in the transfer function from the target speech source to the first microphone is greater than the gain in the transfer function from the target speech source to the second microphone, and the gain in the transfer function from the noise source to the first microphone is less than the gain in the transfer function from the noise source to the second microphone. In this case, if the difference $D_A$ is positive and the difference $D_B$ is negative, the permutation is determined not occurring, and the split spectra $v_{A1}$ and $v_{A2}$ correspond to the target speech signals received at the first and second microphones, respectively, and the split spectra $v_{B1}$ and $v_{B2}$ correspond to the noise signals received at the first and second microphones, respectively. Therefore, the split spectrum $v_{A1}$ is selected as the recovered spectrum of the target speech. On the other hand, if the difference $D_A$ is negative and the difference $D_B$ is positive, the permutation is determined occurring, and the split spectra $v_{A1}$ and $v_{A2}$ correspond to the noise signals received at the first and second microphones, respectively, and the split spectra $v_{B1}$ and $v_{B2}$ correspond to the target speech signals received at the first and second microphones, respectively. Therefore, the split spectrum $v_{B1}$ is selected as the recovered spectrum of the target speech. Thus, the amplitude ambiguity and permutation can be prevented in the recovered target speech.

In the method according to the first aspect of the present invention, it is preferable that the difference $D_A$ is a difference between absolute values of the spectra $v_{A1}$ and $v_{A2}$, and the difference $D_B$ is a difference between absolute values of the spectra $v_{B1}$ and $v_{B2}$. By examining the differences $D_A$ and $D_B$ for each frequency in the frequency domain, the permutation occurrence can be rigorously determined for each frequency.

In the method according to the first aspect of the present invention, it is also preferable that the difference $D_A$ is calculated as a difference between the spectrum $v_{A1}$'s mean square intensity $P_{A1}$ and the spectrum $v_{A2}$'s mean square intensity $P_{A2}$, and the difference $D_B$ is calculated as a difference between the spectrum $v_{B1}$'s mean square intensity $P_{B1}$ and the spectrum $v_{B2}$'s mean square intensity $P_{B2}$. By examining the mean square intensities of the target speech and noise signal components, it becomes easy to visually check the validity of results of the permutation determination process.

In the method according to a second modification of the first aspect of the present invention, if the target speech source is closer to the first microphone than to the second microphone and the noise source is closer to the second microphone than to the first microphone, (i) mean square intensities $P_{A1}$, $P_{A2}$, $P_{B1}$ and $P_{B2}$ of the split spectra $v_{A1}$, $v_{A2}$, $v_{B1}$ and $v_{B2}$, respectively, are calculated, (ii) a difference $D_A$ between the mean square intensities $P_{A1}$ and $P_{A2}$, and a difference $D_B$ between the mean square intensities $P_{B1}$ and $P_{B2}$ are calculated, and (iii) the criteria for extracting a recovered spectrum of the target speech comprise:

(1) if $P_{A1}+P_{A2}>P_{B1}+P_{B2}$ and if the difference $D_A$ is positive, the split spectrum $v_{A1}$ is extracted as the recovered spectrum of the target speech;

(2) if $P_{A1}+P_{A2}>P_{B1}+P_{B2}$ and if the difference $D_A$ is negative, the split spectrum $v_{B1}$ is extracted as the recovered spectrum of the target speech;

(3) if $P_{A1}+P_{A2}<P_{B1}+P_{B2}$ and if the difference $D_B$ is negative, the split spectrum $v_{A1}$ is extracted as the recovered spectrum of the target speech; or (4) if $P_{A1}+P_{A2}<P_{B1}+P_{B2}$ and if the difference $D_B$ is positive, the split spectrum $v_{B1}$ is extracted as the recovered spectrum of the target speech.

The above criteria can be explained as follows. First, if the spectral intensity of the target speech is small in a certain frequency band, the target speech spectra intensity may become smaller than the noise spectral intensity due to superposed background noises. In this case, the permutation problem cannot be resolved if the spectral intensity itself is used in constructing criteria for extracting the recovered spectrum. In order to resolve the above problem, overall mean square intensities $P_{A1}+P_{A2\ 1\ and\ PB1}+P_{B2}$ of the separated signals $U_A$ and $U_B$, respectively, may be used for comparison.

Here, it is assumed that the target speech source is closer to the first microphone than to the second microphone. If $P_{A1}+P_{A2}>P_{B1}+P_{B2}$, the split spectra $v_{A1}$ and $v_{A2}$, which are generated from the separated signal $U_A$, are considered meaningful; further if the difference $D_A$ is positive, the permutation is determined not occurring and the spectrum $v_{A1}$ is extracted as the recovered spectrum of the target speech. If the difference $D_A$ is negative, the permutation is determined occurring and the spectrum $v_{B1}$ is extracted as the recovered spectrum of the target speech.

On the other hand, if $P_{A1}+P_{A2}<P_{B1}+P_{B2}$, the split spectra $v_{B1}$ and $v_{B2}$, which are generated from the separated signal $U_B$, are considered meaningful; further if the difference $D_B$ is negative, the permutation is determined occurring and the spectrum $v_{A1}$ is extracted as the recovered spectrum of the target speech. If the difference $D_B$ is positive, the permutation is determined not occurring and the spectrum $v_{B1}$ is extracted as the recovered spectrum of the target speech.

According to a second aspect of the present invention, there is provided a method for recovering target speech based on split spectra using sound sources' locational information, comprising: the first step of receiving target speech from a sound source and noise from another sound source and forming mixed signals of the target speech and the noise at a first microphone and at a second microphone, which are provided at different locations; the second step of performing the Fourier transform of the mixed signals from a time domain to a frequency domain, decomposing the mixed signals into two separated signals $U_A$ and $U_B$ by use of the FastICA, and, based on transmission path characteristics of the four different paths from the two sound sources to the first and second microphones, generating from the separated signal $U_A$ a pair of split spectra $v_{A1}$ and $v_{A2}$, which were received at the first and second microphones respectively, and from the separated signal $U_B$ another pair of split spectra $v_{B1}$ and $v_{B2}$, which were received at the first and second microphones respectively; and the third step of extracting estimated spectra corresponding to the respective sound sources to generate a recovered spectrum group of the target speech, wherein the split spectra are analyzed by applying criteria based on:

(A) signal output characteristics in the FastICA which outputs the split spectra corresponding to the target speech and the noise in the separated signals $U_A$ and $U_B$ respectively; and (B) sound transmission characteristics that depend on the four different distances between the first and second microphones and the two sound sources, and performing the inverse Fourier transform of the recovered spectrum group from the frequency domain to the time domain to recover the target speech.

The FastICA method is characterized by its capability of sequentially separating signals from the mixed signals in descending order of non-Gaussianity. Speech generally has higher non-Gaussianity than noises. Thus, if observed sounds consist of the target speech (i.e. speaker's speech) and the noise, it is highly probable that a split spectrum corresponding to the speaker's speech is in the separated signal $U_A$, which is the first output of this method.

Due to sound transmission characteristics that depend on the four different distances between the first and second microphones and the two sound sources (e.g. sound intensities), the spectral intensities of the split spectra $v_{A1}$, $v_{A2}$, $v_{B1}$ and $v_{B2}$ for each frequency differ from one another. Therefore, if distinctive distances are provided between the first and second microphones and the sound sources, it is possible to determine which microphone received which sound source's signal. That is, it is possible to identify the sound source for each of the split spectra $v_{A1}$, $v_{A2}$, $v_{B1}$, and $v_{B2}$. Using this information, a spectrum corresponding to the target speech can be selected from the split spectra $v_{A1}$, $v_{A2}$, $v_{B1}$ and $v_{B2}$ for each frequency, and the recovered spectrum group of the target speech can be generated.

Finally, the target speech can be obtained by performing the inverse Fourier transform of the recovered spectrum group from the frequency domain to the time domain. Therefore, in this method, the amplitude ambiguity and permutation can be prevented in the recovered target speech.

In the method according to a first modification of the second aspect of the present invention, if one of the two sound sources is closer to the first microphone than to the second microphone and if the other sound source is closer to the second microphone than to the first microphone, (i) a difference $D_A$ between the split spectra $v_{A1}$ and $v_{A2}$ and a difference $D_B$ between the split spectra $v_{B1}$ and $v_{B2}$ for each frequency are calculated, (ii) the criteria comprise:

(1) if the difference $D_A$ is positive and if the difference $D_B$ is negative, the split spectrum $v_{A1}$ is extracted as an estimated spectrum $y_1$ for the one sound source, or (2) if the difference $D_A$ is negative and if the difference $D_B$ is positive, the split spectrum $v_{B1}$ is extracted as an estimated spectrum $y_1$ for the one sound source, to form an estimated spectrum group $Y_1$ for the one sound source, which includes the estimated spectrum $y_1$ as a component; and (3) if the difference $D_A$ is negative and if the difference $D_B$ is positive, the split spectrum $v_{A2}$ is extracted as an estimated spectrum $y_2$ for the other sound source, or (4) if the difference $D_A$ is positive and if the difference $D_B$ is negative, the split spectrum $v_{B2}$ is extracted as an estimated spectrum $y_2$ for the other sound source, to form an estimated spectrum group $Y_2$ for the other sound source, which includes the estimated spectrum $y_2$ as a component, (iii) the number of occurrences $N^+$ when the difference $D_A$ is positive and the difference $D_B$ is negative, and the number of occurrences $N^-$ when the difference $D_A$ is negative and the difference $D_B$ is positive are counted over all the frequencies, and (iv) the criteria further comprise:

(a) if $N^+$ is greater than $N^-$, the estimated spectrum group $Y_1$ is selected as the recovered spectrum group of the target speech; or (b) if $N^-$ is greater than $N^+$, the estimated spectrum group $Y_2$ is selected as the recovered spectrum group of the target speech.

The above criteria can be explained as follows. First, note that the split spectra generally have two candidate spectra corresponding to a single sound source. For example, if there is no permutation, $v_{A1}$ and $v_{A2}$ are the two candidates for the single sound source, and, if there is permutation, $v_{B1}$ and $v_{B2}$ are the two candidates for the single sound source. Here, if there is no permutation, the spectrum $v_{A1}$ is selected as an estimated spectrum $y_1$ of a signal from the one sound source that is closer to the first microphone than to the second microphone. This is because the spectral intensity of $v_{A1}$ observed at the first microphone is greater than the spectral intensity of $v_{A2}$, and $v_{A1}$ is less subject to the background noise than $v_{A2}$. Also if there is permutation, the spectrum $v_{B1}$ is selected as the estimated spectrum $y_1$ for the one sound source.

Similarly for the other sound source, the spectrum $v_{B2}$ is selected if there is no permutation, and the spectrum $v_{A2}$ is selected if there is permutation.

Furthermore, since the speaker's speech is highly probable to be outputted in the separated signal $U_A$, if the one sound source is the speaker's speech source, the probability that the permutation does not occur becomes high. If, on the other hand, the other sound source is the speaker's speech source, the probability that the permutation occurs becomes high.

Therefore, while generating the estimated spectrum groups $Y_1$ and $Y_2$ from the estimated spectra $y_1$ and $y_2$ respectively, the speaker's speech (the target speech) can be selected from the recovered spectrum groups by counting the number of permutation occurrences, i.e. $N^+$ and $N^-$, over all the frequencies, and using the criteria as:

(a) if $N^+$ is greater than $N^-$, select the estimated spectrum group $Y_1$ as the recovered spectrum group of the target speech; or (b) if $N^-$ is greater than the count $N^+$, select the estimated spectrum group $Y_2$ as the recovered spectrum group of the target speech.

In the method according to the second aspect of the present invention, it is preferable that the difference $D_A$ is a difference between absolute values of the spectra $v_{A1}$ and $v_{A2}$, and the difference $D_B$ is a difference between absolute values of the spectra $v_{B1}$ and $v_{B2}$. By obtaining the difference $D_A$ and $D_B$ for each frequency, the permutation occurrence can be determined for each frequency, and the number of permutation occurrences can be rigorously counted while generating the estimated spectrum groups $Y_1$ and $Y_2$.

In the method according to the second aspect of the present invention, it is also preferable that the difference $D_A$ is calculated as a difference between the spectrum $v_{A1}$'s mean square intensity $P_{A1}$ and the spectrum $v_{A2}$'s mean square intensity $P_{A2}$, and the difference $D_B$ is calculated as a difference between the spectrum $v_{B1}$'s mean square intensity $P_{B1}$ and the spectrum $v_{B2}$'s mean square intensity $P_{B2}$. By examining the mean square intensities of the target speech and noise signal components, it becomes easy to visually check the validity of results of the permutation determination process. As a result, the number of permutation occurrences can be easily counted while generating the estimated spectrum groups $Y_1$ and $Y_2$.

In the method according to the second aspect of the present invention, if one of the two sound sources is closer to the first microphone than to the second microphone and the other sound source is closer to the second microphone than to the first microphone, (i) mean square intensities $P_{A1}$, $P_{A2}$, $P_{B1}$ and $P_{B2}$ of the split spectra $v_{A1}$, $v_{A2}$, $v_{B1}$ and $v_{B2}$, respectively, are calculated for each frequency, (ii) a difference $D_A$ between the mean square intensities $P_{A1}$ and $P_{A2}$, and a difference $D_B$ between the mean square intensities $P_{B1}$ and $P_{B2}$ are calculated, (iii) the criteria comprise:

(A) if $P_{A1}+P_{A2}>P_{B1}+P_{B2}$, (1) if the difference $D_A$ is positive, the split spectrum $v_{A1}$ is extracted as an estimated spectrum $y_1$ for the one sound source, or (2) if the difference $D_A$ is negative, the split spectrum $v_{B1}$ is extracted as an estimated spectrum $y_1$ for the one sound source, to form an estimated spectrum group $Y_1$ for the one sound source, which includes the estimated spectrum $y_1$ as a component, and (3) if the difference $D_A$ is negative, the split spectrum $v_{A2}$ is extracted as an estimated spectrum $y_2$ for the other sound source, or (4) if the difference $D_A$ is positive, the split spectrum $v_{B2}$ is extracted as an estimated spectrum $y_2$ for the other sound source, to form an estimated spectrum group $Y_2$ for the other sound source, which includes the estimated spectrum $y_2$ as a component; or (B) if $P_{A1}+P_{A2}<P_{B1}+P_{B2}$, (5) if the difference $D_B$ is negative, the split spectrum $v_{A1}$ is extracted as an estimated spectrum $y_1$ for the one sound source, or (6) if the difference $D_B$ is positive, the split spectrum $v_{B1}$ is extracted as an estimated spectrum $y_1$ for the one sound source, to form an estimated spectrum group $Y_1$ for the one sound source, which includes the estimated spectrum $y_1$ as a component, and (7) if the difference $D_B$ is positive, the split spectrum $v_{A2}$ is extracted as an estimated spectrum $y_2$ for the other sound source, or (8) if the difference $D_B$ is negative, the split spectrum $v_{B2}$ is extracted as an estimated spectrum $y_2$ for the other sound source, to form an estimated spectrum group $Y_2$ for the other sound source, which includes the estimated spectrum $y_2$ as a component, (iv) the number of occurrences $N^+$ when the difference $D_A$ is positive and the difference $D_B$ is negative, and the number of occurrences $N^-$ when the difference $D_A$ is negative and the difference $D_B$ is positive are counted over all the frequencies, and (v) the criteria further comprise:

(a) if $N^+$ is greater than $N^-$, the estimated spectrum group $Y_1$ is selected as the recovered spectrum group of the target speech; or (b) if $N^-$ is greater than $N^+$, the estimated spectrum group $Y_2$ is selected as the recovered spectrum group of the target speech.

The above criteria can be explained as follows. First, if the spectral intensity of the target speech is small in a certain frequency band, the target speech spectral intensity may become smaller than the noise spectral intensity due to superposed background noises. In this case, the permutation problem cannot be resolved if the spectral intensity itself is used in constructing criteria for extracting the recovered spectrum. In order to resolve the above problem, overall mean square intensities $P_{A1}+P_{A2}$ and $P_{B1}+P_{B2}$ of the separated signals $U_A$ and $U_B$, respectively, may be used for comparison.

Here, it is assumed that one of the two sound sources is closer to the first microphone than to the second microphone. If $P_{A1}+P_{A2}>P_{B1}+P_{B2}$ and if the difference $D_A$ is positive, the permutation is determined not occurring and the spectra $v_{A1}$ and $v_{B2}$ are extracted as the estimated spectra $y_1$ and $y_2$, respectively. If $P_{A1}+P_{A2}>P_{B1}+P_{B2}$ and if the difference $D_A$ is negative, the permutation is determined occurring and the spectra $v_{B1}$ and $v_{A2}$ are extracted as the estimated spectra $y_1$ and $y_2$, respectively.

On the other hand, if $P_{A1}+P_{A2}<P_{B1}+P_{B2}$ and if the difference $D_B$ is negative, the permutation is determined occurring and the spectra $v_{A1}$ and $v_{B2}$ are extracted as the estimated spectra $y_1$ and $y_2$, respectively. If $P_{A1}+P_{A2}<P_{B1}+P_{B2}$ and if the difference $D_B$ is positive, the permutation is determined occurring and the spectra $v_{B1}$ and $v_{A2}$ are extracted as the estimated spectra $y_1$ and $y_2$, respectively. Then, the one sound source's estimated spectrum group $Y_1$ and the other sound source's estimated spectrum group $Y_2$ are constructed from the extracted estimated spectra $y_1$ and $y_2$, respectively.

Also, since the speaker's speech is highly probable to be outputted in the separated signal $U_A$, if the one sound source is the target speech source (i.e. the speaker's speech source), the probability that the permutation does not occur becomes high. If, on the other hand, the other sound source is the target speech source, the probability that the permutation occurs becomes high. Therefore, while generating the estimated spectrum groups $Y_1$ and $Y_2$, the target speech can be selected from the estimated spectrum groups by counting the number of permutation occurrences, i.e. $N^+$ and $N^-$, over all the frequencies, and using the criteria as:

(a) if the count $N^+$ is greater than the count $N^-$, select the estimated spectrum group $Y_1$ as the recovered spectrum group of the target speech; or (b) if the count $N^-$ is greater than the count $N^+$, select the estimated spectrum group $Y_2$ as the recovered spectrum group of the target speech.

DETAILED DESCRIPTION OF THE PREFERRED EMBODIMENTS

Embodiments of the present invention are described below with reference to the accompanying drawings to facilitate understanding of the present invention.

Figure 1:
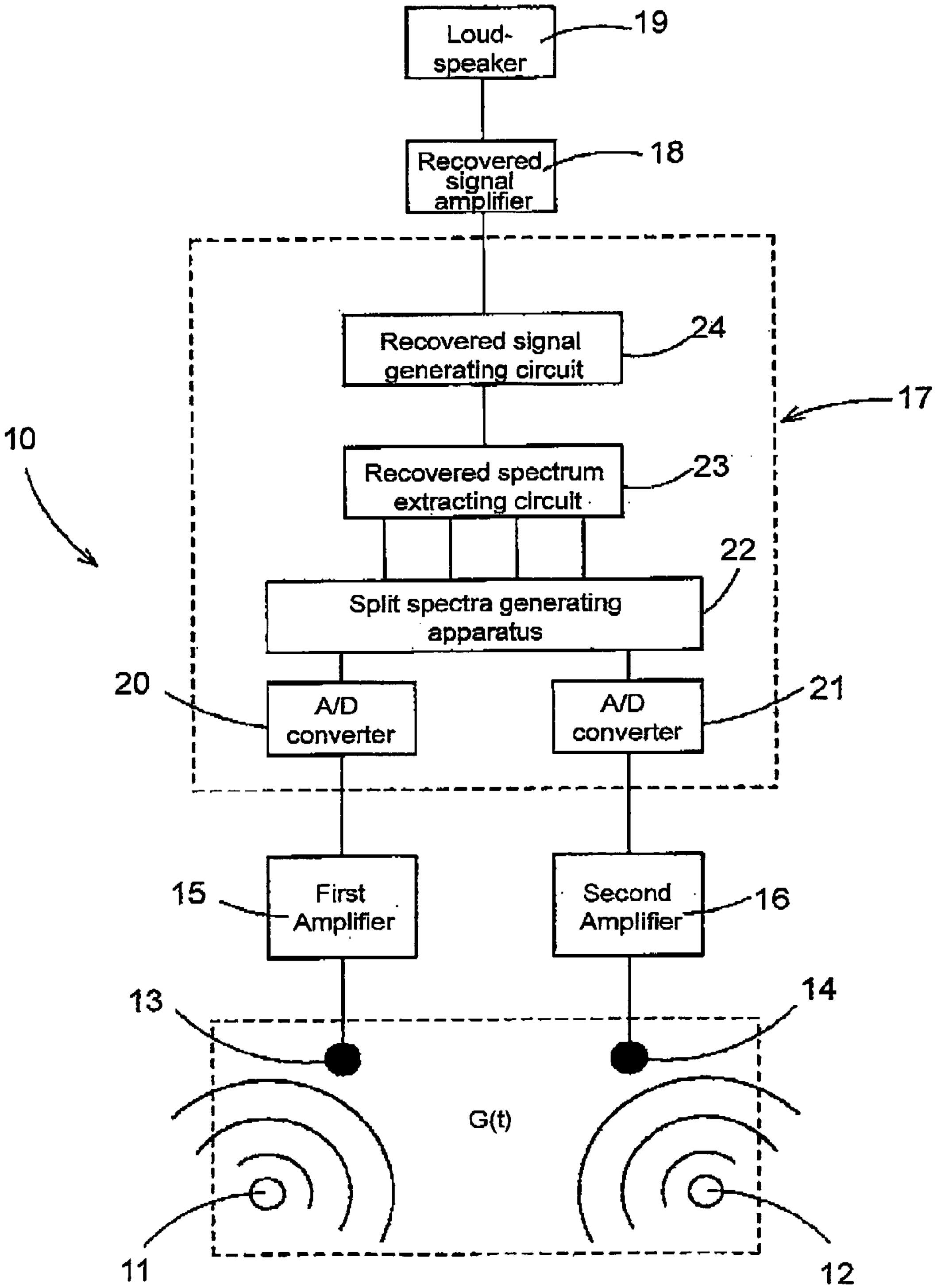
FIG. 1 is a block digram showing a target speech recovering apparatus employing a method for recovering target speech based on split spectra using sound sources' locational information according to a first embodiment of the present invention.

As shown in FIG. 1, a target speech recovering apparatus 10, which employs a method for recovering target speech based on split spectra using sound sources' locational information according to the first embodiment of the present invention, comprises a first microphone 13 and a second microphone 14, which are provided at different locations for receiving target speech and noise signals transmitted from a target speech source 11 and a noise source 12, a first amplifier 15 and a second amplifier 16 for amplifying the mixed signals of the target speech and the noise received at the microphones 13 and 14 respectively, a recovering apparatus body 17 for separating the target speech and the noise in the mixed signals entered through the amplifiers 15 and 16 and outputting the target speech and the noise as recovered signals, a recovered signal amplifier 18 for amplifying the recovered signals outputted from the recovering apparatus body 17, and a loudspeaker 19 for outputting the amplified recovered signals. These elements are described in detail below.

For the first and second microphones 13 and 14, microphones with a frequency range wide enough to receive signals over the audible range (10–20000 Hz) can be used. Here, the first microphone 13 is placed more closely to the target speech source 11 than the second microphone 14 is.

For the amplifiers 15 and 16, amplifiers with frequency band characteristics that allow non-distorted amplification of audible signals can be used.

The recovering apparatus body 17 comprises A/D converters 20 and 21 for digitizing the mixed signals entered through the amplifiers 15 and 16, respectively.

The recovering apparatus body 17 further comprises a split spectra generating apparatus 22, equipped with a signal separating arithmetic circuit and a spectrum splitting arithmetic circuit. The signal separating arithmetic circuit performs the Fourier transform of the digitized mixed signals from the time domain to the frequency domain, and decomposes the mixed signals into two separated signals $U_A$ and $U_B$ by means of the Independent Component Analysis (ICA). Based on transmission path characteristics of the four possible paths from the target speech source 11 and the noise source 12 to the first and second microphones 13 and 14, the spectrum splitting arithmetic circuit generates from the separated signal $U_A$ one pair of split spectra $v_{A1}$ and $v_{A2}$ which were received at the first microphone 13 and the second microphone 14 respectively, and generates from the separated signal $U_B$ another pair of split spectra $v_{B1}$ and $v_{B2}$ which were received at the first microphone 13 and the second microphone 14 respectively.

Moreover, the recovering apparatus body 17 comprises: a recovered spectrum extracting circuit 23 for extracting a recovered spectrum to recover the target speech, wherein the split spectra generated by the split spectra generating apparatus 22 are analyzed by applying criteria based on sound transmission characteristics that depend on the four different distances between the first and second microphones 13 and 14 and the target speech and noise sources 11 and 12; and a recovered signal generating circuit 24 for performing the inverse Fourier transform of the recovered spectrum from the frequency domain to the time domain to generate the recovered signal.

The split spectra generating apparatus 22, equipped with the signal separating arithmetic circuit and the spectrum splitting arithmetic circuit, the recovered spectrum extracting circuit 23, and the recovered signal generating circuit 24 can be structured by loading programs for executing each circuit's functions on, for example, a personal computer. Also, it is possible to load the programs on a plurality of microcomputers and form a circuit for collective operation of these microcomputers.

In particular, if the programs are loaded on a personal computer, the entire recovering apparatus body 17 can be structured by incorporating the A/D converters 20 and 21 into the personal computer.

For the recovered signal amplifier 18, amplifiers that allow analog conversion and non-distorted amplification of audible signals can be used. Loudspeakers that allow non-distorted output of audible signals can be used for the loudspeaker 19.

Figure 2:
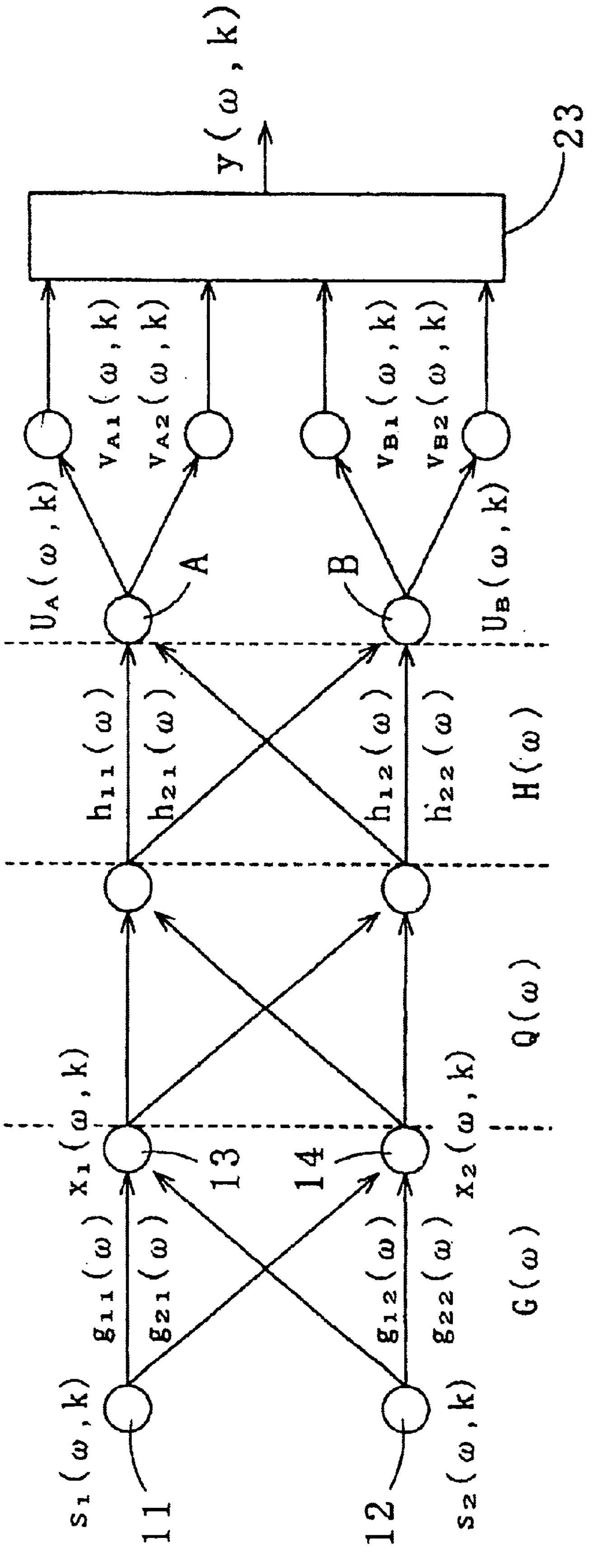
FIG. 2 is an explanatory view showing a signal flow in which a recovered spectrum of the target speech is generated from the target speech and noise in the method set forth in FIG. 1.

As shown in FIG. 2, the method for recovering target speech based on split spectra using sound sources' locational information according to the first embodiment of the present invention comprises: the first step of receiving a target speech signal $s_1(t)$ from the target speech source 11 and a noise signal $s_2(t)$ from the noise source 12 at the first and second microphones 13 and 14 and forming mixed signals $x_1(t)$ and $x_2(t)$ at the first microphone 13 and at the second microphone 14 respectively; the second step of performing the Fourier transform of the mixed signals $x_1(t)$ and $x_2(t)$ from the time domain to the frequency domain, decomposing the mixed signals into two separated signals $U_A$ and $U_B$ by means of the Independent Component Analysis, and, based on respective transmission path characteristics of the four possible paths from the target speech source 11 and the noise source 12 to the first and second microphones 13 and 14, generating from the separated signal $U_A$ one pair of split spectra $v_{A1}$ and $v_{A2}$, which were received at the first microphone 13 and the second microphone 14 respectively, and from the separated signal $U_B$ another pair of split spectra $v_{B1}$ and $v_{B2}$, which were received at the first microphone 13 and the second microphone 14 respectively; and the third step of extracting a recovered spectrum y, wherein the split spectra are analyzed by applying criteria based on sound transmission characteristics that depend on the four different distances between the first and second microphones 13 and 14 and the target speech and noise sources 11 and 12, and performing the inverse Fourier transform of the recovered spectrum y from the frequency domain to the time domain to recover the target speech. (t represents time throughout.) The above steps are described in detail below.

1. First Step

In general, the target speech signal $s_1(t)$ from the target speech source 11 and the noise signal $s_2(t)$ from the noise source 12 are assumed statistically independent of each other. The mixed signals $x_1(t)$ and $x_2(t)$, which are obtained by receiving the target speech signal $s_1(t)$ and the noise signal $s_2(t)$, at the microphones 13 and 14 respectively, are expressed as in Equation (1):

$$x(t)=G(t)*s(t) \tag{1}$$

where $s(t)=[s_1(t), s_2(t)]^T$, $x(t)=[x_1(t), x_2(t)]^T$, * is a superposition symbol, and G(t) is a transfer function from the target speech and noise sources 11 and 12 to the first and second microphones 13 and 14.

2. Second Step

As in Equation (1), when signals from the target speech and noise sources 11 and 12 are superposed, it is difficult to separate the target speech signal $s_1(t)$ and the noise signal $s_2(t)$ in each of the mixed signals $x_1(t)$ and $x_2(t)$ in the time domain. Therefore, the mixed signals $x_1(t)$ and $x_2(t)$ are divided into short time intervals (frames) and are transformed from the time domain to the frequency domain for each frame as in Equation (2):

$$x_j(\omega, k) = \sum_t e^{-\sqrt{-1}\,\omega t} x_j(t) w(t - k\tau) \tag{2}$$
$$(j = 1, 2;\ k = 0, 1, \cdots, K-1)$$

where ω (=0, 2π/M, . . . , 2π(M−1)/M) is a normalized frequency, M is the number of samplings in a frame, w(t) is a window function, τ is a frame interval, and K is the number of frames. For example, the time interval can be about several 10 msec. In this way, it is also possible to treat the spectra as time-series spectra by laying out the spectra at each frequency in the order of frames.

In this case, mixed signal spectra x(ω,k) and corresponding spectra of the target speech signal $s_1(t)$ and the noise signal $s_2(t)$ are related to each other in the frequency domain as in Equation (3):

$$x(\omega,k)=G(\omega)s(\omega,k) \tag{3}$$

where s(ω,k) is the discrete Fourier transform of a windowed s(t), and G(ω) is a complex number matrix that is the discrete Fourier transform of G(t).

Since the target speech signal spectrum $s_1(\omega,k)$ and the noise signal spectrum $s_2(\omega,k)$ are inherently independent of each other, if mutually independent separated spectra $U_A(\omega, k)$ and $U_B(\omega,k)$ are calculated from the mixed signal spectra x(ω,k) by use of the Independent Component Analysis, these separated spectra correspond to the target speech signal spectrum $s_1(\omega,k)$ and the noise signal spectrum $s_2(\omega,k)$ respectively. In other words, by obtaining a separation matrix H(ω) with which the relationship expressed in Equation (4) is valid between the mixed signal spectra x(ω,k) and the separated signal spectra $U_A(\omega,k)$ and $U_B(\omega,k)$, it becomes possible to determine mutually independent separated signal spectra $U_A(\omega,k)$ and $U_B(\omega,k)$ from the mixed signal spectra x(ω,k).

$$u(\omega,k)=H(\omega)x(\omega,k) \tag{4}$$

where $u(\omega,k)=[U_A(\omega,k),U_B(\omega,k)]^T$.

Incidentally, in the frequency domain, amplitude ambiguity and permutation occur at individual frequencies ω as in Equation (5):

$$H(\omega)Q(\omega)G(\omega)=PD(\omega) \tag{5}$$

where Q(ω) is a whitening matrix, P is a matrix representing the permutation with diagonal elements of 0 and off-diagonal elements of 1, and $D(\omega)=\mathrm{diag}[d_1(\omega),d_2(\omega)]$ is a diagonal matrix representing the amplitude ambiguity. Therefore, these problems need to be addressed in order to obtain meaningful separated signals for recovering.

In the frequency domain, on the assumption that its real and imaginary parts have the mean 0 and the same variance and are uncorrelated, each sound source spectrum $s_i(\omega,k)$ (i=1,2) is formulated as follows.

First, at a frequency ω, a separation weight $h_n(\omega)$ (n=1,2) is obtained according to the FastICA algorithm, which is a modification of the Independent Component Analysis algorithm, as shown in Equations (6) and (7):

$$h_n^+(\omega)=\frac{1}{K}\sum_{k=0}^{K-1}\{x(\omega,k)\overline{u}_n(\omega,k)f(|u_n(\omega,k)|^2)-[f(|u_n(\omega,k)|^2)+|u_n(\omega,k)|^2f'(|u_n(\omega,k)|^2)]h_n(\omega)\} \tag{6}$$

$$h_n(\omega)=h_n^+(\omega)/\|h_n^+(\omega)\| \tag{7}$$

where $f(|u_n(\omega,k)|^2)$ is a nonlinear function, and $f'(|u_n(\omega,k)|^2)$ is the derivative of $f(|u_n(\omega,k)|^2)$, is a conjugate sign, and K is the number of frames.

This algorithm is repeated until a convergence condition CC shown in Equation (8):

$$CC=\overline{h}_n^T(\omega)\,h_n^+(\omega)\simeq 1 \tag{8}$$

is satisfied (for example, CC becomes greater than or equal to 0.9999). Further, $h_2(\omega)$ is orthogonalized with $h_1(\omega)$ as in Equation (9):

$$h_2(\omega)=h_2(\omega)-h_1(\omega)\overline{h}_1^T(\omega)h_2(\omega) \tag{9}$$

and normalized as in Equation (7) again.

The aforesaid FastICA algorithm is employed for each frequency ω. The obtained separation weights $h_n(\omega)$ (n=1,2) determine H(ω) as in Equation (10):

$$H(\omega)=\left[\overline{h}_1^T(\omega),\ \overline{h}_2^T(\omega)\right]^T \tag{10}$$

which is used in Equation (4) to calculate the separated signal spectra $u(\omega,k)=[U_A(\omega,k),U_B(\omega,k)]^T$ at each frequency. As shown in FIG. 2, two nodes where the separated signal spectra $U_A(\omega,k)$ and $U_B(\omega,k)$ are outputted are referred to as A and B.

The split spectra $v_A(\omega,k)=[v_{A1}(\omega,k),v_{A2}(\omega,k)]^T$ and $v^B(\omega,k)=[v_{B1}(\omega,k),v_{B2}(\omega,k)]^T$ are defined as spectra generated as a pair (1 and 2) at each node n (=A,B) from each separated signal spectrum $U_n(\omega,k)$ as shown in Equations (11) and (12):

$$\begin{bmatrix} v_{A1}(\omega,k) \\ v_{A2}(\omega,k) \end{bmatrix}=(H(\omega)Q(\omega))^{-1}\begin{bmatrix} U_A(\omega,k) \\ 0 \end{bmatrix} \tag{11}$$

$$\begin{bmatrix} v_{B1}(\omega,k) \\ v_{B2}(\omega,k) \end{bmatrix}=(H(\omega)Q(\omega))^{-1}\begin{bmatrix} 0 \\ U_B(\omega,k) \end{bmatrix} \tag{12}$$

If the permutation is not occurring but the amplitude ambiguity exists, the separated signal spectrum $U_n(\omega,k)$ is outputted as in Equation (13):

$$\begin{bmatrix} U_A(\omega,k) \\ U_B(\omega,k) \end{bmatrix}=\begin{bmatrix} d_1(\omega)s_1(\omega,k) \\ d_2(\omega)s_2(\omega,k) \end{bmatrix} \tag{13}$$

Then, the split spectra for the above separated signal spectra $U_n(\omega,k)$ are generated as in Equations (14) and (15):

$$\begin{bmatrix} v_{A1}(\omega,k) \\ v_{A2}(\omega,k) \end{bmatrix}=\begin{bmatrix} g_{11}(\omega)s_1(\omega,k) \\ g_{21}(\omega)s_1(\omega,k) \end{bmatrix} \tag{14}$$

$$\begin{bmatrix} v_{B1}(\omega,k) \\ v_{B2}(\omega,k) \end{bmatrix}=\begin{bmatrix} g_{12}(\omega)s_2(\omega,k) \\ g_{22}(\omega)s_2(\omega,k) \end{bmatrix} \tag{15}$$

which show that the split spectra at each node are expressed as the product of the target speech spectrum $s_1(\omega,k)$ and the transfer function, or the product of the noise signal spectra $s_2(\omega,k)$ and the transfer function. Note here that $g_{11}(\omega)$ is a transfer function from the target speech source 11 to the first microphone 13, $g_{21}(\omega)$ is a transfer function from the target speech source 11 to the second microphone 14, $g_{12}(\omega)$ is a transfer function from the noise source 12 to the first microphone 13, and $g_{22}(\omega)$ is a transfer function from the noise source 12 to the second microphone 14.

If there are both permutation and amplitude ambiguity, the separated signal spectra $U_n(\omega,k)$ are expressed as in Equation (16):

$$\begin{bmatrix} U_A(\omega,k) \\ U_B(\omega,k) \end{bmatrix}=\begin{bmatrix} d_1(\omega)s_2(\omega,k) \\ d_2(\omega)s_1(\omega,k) \end{bmatrix} \tag{16}$$

and the split spectra at the nodes A and B are generated as in Equations (17) and (18):

$$\begin{bmatrix} v_{A1}(\omega, k) \\ v_{A2}(\omega, k) \end{bmatrix} = \begin{bmatrix} g_{12}(\omega)s_2(\omega, k) \\ g_{22}(\omega)s_2(\omega, k) \end{bmatrix} \tag{17}$$

$$\begin{bmatrix} v_{B1}(\omega, k) \\ v_{B2}(\omega, k) \end{bmatrix} = \begin{bmatrix} g_{11}(\omega)s_1(\omega, k) \\ g_{21}(\omega)s_1(\omega, k) \end{bmatrix} \tag{18}$$

In the above, the spectrum $v_{A1}(\omega,k)$ generated at the node A represents a spectrum of the noise signal spectrum $s_2(\omega,k)$ which is transmitted from the noise source 12 and observed at the first microphone 13, the spectrum $v_{A2}(\omega,k)$ generated at the node A represents a spectrum of the noise signal spectrum $s_2(\omega,k)$ which is transmitted from the noise source 12 and observed at the second microphone 14, the spectrum $v_{B1}(\omega,k)$ generated at the node B represents a spectrum of the target speech signal spectrum $s_1(\omega,k)$ which is transmitted from the target speech source 11 and observed at the first microphone 13, and the spectrum $v_{B2}(\omega,k)$ generated at the node B represents a spectrum of the target speech signal spectrum $s_1(\omega,k)$ which is transmitted from the target speech source 11 and observed at the second microphone 14.

3. Third Step

Each of the four spectra $v_{A1}(\omega,k)$, $v_{A2}(\omega,k)$, $v_{B1}(\omega,k)$ and $v_{B2}(\omega,k)$ shown in FIG. 2 has each corresponding sound source and transmission path depending on the occurrence of the permutation, but is determined uniquely with an exclusive combination of one sound source and one transmission path. Moreover, the amplitude ambiguity remains in the separated signal spectra $U_n(\omega,k)$ as in Equations (13) and (16), but not in the split spectra as shown in Equations (14), (15), (17) and (18).

Here, it is assumed that the target speech source 11 is closer to the first microphone 13 than to the second microphone 14 and that the noise source 12 is closer to the second microphone 14 than to the first microphone 13. In this case, comparison between transmission characteristics of the two possible paths from the target speech source 11 to the microphones 13 and 14 provides a gain comparison as in Equation (19):

$$|g_{11}(\omega)|>|g_{21}(\omega)| \tag{19}$$

Similarly, by comparing between transmission characteristics of the two possible paths from the noise source 12 to the microphones 13 and 14, a gain comparison is obtained as in Equation (20):

$$|g_{12}(\omega)|<|g_{22}(\omega)| \tag{20}$$

In this case, when Equations (14) and (15) or Equations (17) and (18) are used with the gain comparison in Equations (19) and (20), if there is no permutation, calculation of the difference $D_A$ between the spectra $v_{A1}$ and $v_{A2}$ and the difference $D_B$ between the spectra $v_{B1}$ and $v_{B2}$ shows that $D_A$ at the node A is positive and $D_B$ at the node B is negative. On the other hand, if there is permutation, the similar analysis shows that $D_A$ at the node A is negative and $D_B$ at the node B is positive.

In other words, the occurrence of permutation is recognized by examining the differences $D_A$ and $D_B$ between respective split spectra: if $D_A$ at the node A is positive and $D_B$ at the node B is negative, the permutation is considered not occurring; and if $D_A$ at the node A is negative and $D_B$ at the node B is positive, the permutation is considered occurring.

In case the difference $D_A$ is calculated as a difference between absolute values of the spectra $v_{A1}$ and $v_{A2}$, and the difference $D_B$ is calculated as a difference between absolute values of the spectra $v_{B1}$ and $v_{B2}$, the differences $D_A$ and $D_B$ are expressed as in Equations (21) and (22), respectively:

$$D_A=|v_{A1}(\omega,k)|-|v_{A2}(\omega,k)| \tag{21}$$

$$D_B=|v_{B1}(\omega,k)|-|v_{B2}(\omega,k)| \tag{22}$$

The occurrence of permutation is summarized as in Table 1 based on these differences.

TABLE 1

| Component | Difference Between Split Spectra | |
|---|---|---|
| Displacement | Node A: $D_A$ = $(\lvert v_{A1}(\omega, k)\rvert - \lvert v_{A1}(\omega, k)\rvert)$ | Node B: $D_B$ = $(\lvert v_{B1}(\omega, k)\rvert - \lvert v_{B1}(\omega, k)\rvert)$ |
| No | Positive | Negative |
| Yes | Negative | Positive |

Out of the two split spectra obtained for the target speech source 11, the one corresponding to the signal received at the first microphone 13, which is closer to the target speech source 11 than the second microphone 14 is, is selected as a recovered spectrum $y(\omega,k)$ of the target speech. This is because the received target speech signal is greater at the first microphone 13 than at the second microphone 14, and even if background noise level is nearly equal at the first and second microphones 13 and 14, its influence over the received target speech signal is less at the first microphone 13 than at the second microphone 14.

When the above selection criteria are employed, if $D_A$ at the node A is positive and $D_B$ at the node B is negative, the permutation is determined not occurring, and the spectrum $v_{A1}$ is extracted as the recovered spectrum $y(\omega,k)$ of the target speech; if $D_A$ at the node A is negative and $D_B$ at the node B is positive, the permutation is determined occurring, and the spectrum $v_{B1}$ is extracted as the recovered spectrum $y(\omega,k)$, as shown in Equation (23):

$$y(\omega, k) = \begin{cases} v_{A1}(\omega, k) & \text{if } D_A > 0, D_B < 0 \\ v_{B1}(\omega, k) & \text{if } D_A < 0, D_B > 0 \end{cases} \tag{23}$$

The recovered signal y(t) of the target speech is obtained by performing the inverse Fourier transform of the recovered spectrum series $\{y(\omega,k)|k=0,1, \ldots ,K-1\}$ for each frame back to the time domain, and then taking the summation over all the frames as in Equation (24):

$$y(t) = \frac{1}{2\pi}\frac{1}{W(t)}\sum_k \sum_\omega e^{\sqrt{-1}\,\omega(t-k\tau)} y(\omega, k) \tag{24}$$

$$W(t) = \sum_k \omega(t - k\tau)$$

In a first modification of the method for recovering target speech based on split spectra using sound sources' locational information according to the first embodiment, the difference $D_A$ is calculated as a difference between the spectrum $v_{A1}$'s mean square intensity $P_{A1}$ and the spectrum $v_{A2}$'s mean square intensity $P_{A2}$; and the difference $D_B$ is calculated as a difference between the spectrum $v_{B1}$'s mean square intensity $P_{B1}$ and the spectrum $v_{B2}$'s mean square intensity $P_{B2}$. Here, the spectrum $v_{A1}$'s mean square intensity $P_{A1}$ and the spectrum $v_{B1}$'s mean square intensity $P_{B1}$ are expressed as in Equation (25):

$$P_{nl}(\omega) = \frac{1}{K}\sum_{k=0}^{K-1}\left|v_{nl}(\omega, k)\right|^2 \quad (25)$$

where n=A or B. Thereafter, the recovered spectrum y(ω,k) of the target speech is obtained as in Equation (26):

$$y(\omega) = \begin{cases} v_{Al}(\omega) & \text{if } D_A > 0, D_B < 0 \\ v_{Bl}(\omega) & \text{if } D_A < 0, D_B > 0 \end{cases} \quad (26)$$

In a second modification of the method according to the first embodiment, selection criteria are obtained as follows. Namely, if the target speech source 11 is closer to the first microphone 13 than to the second microphone 14 and if the noise source 12 is closer to the second microphone 14 than to the first microphone 13, the criteria are constructed by calculating the mean square intensities $P_{A1}$, $P_{A2}$, $P_{B1}$ and $P_{B2}$ of the spectra $v_{A1}$, $v_{A2}$, $v_{B1}$ and $v_{B2}$ respectively; calculating a difference $D_A$ between the mean square intensities $P_{A1}$ and $P_{A2}$ and a difference $D_B$ between the mean square intensities $P_{B1}$ and $P_{B2}$; and if $P_{A1}+P_{A2}>P_{B1}+P_{B2}$ and if the difference $D_A$ is positive, extracting the spectrum $v_{A1}$ as the recovered spectrum y(ω,k), or if $P_{A1}+P_{A2}>P_{B1}+P_{B2}$ and if the difference $D_A$ is negative, extracting the spectrum $v_{B1}$ as the recovered spectrum y(ω,k) as shown in Equation (27):

$$y(\omega) = \begin{cases} v_{Al}(\omega) & \text{if } D_A > 0 \\ v_{Bl}(\omega) & \text{if } D_A < 0 \end{cases} \quad (27)$$

Also, if $P_{A1}+P_{A2}<P_{B1}+P_{B2}$ and if the difference $D_B$ is negative, the spectrum $v_{A1}$ is extracted as the recovered spectrum y(ω,k), or if $P_{A1}+P_{A2}<P_{B1}+P_{B2}$ and if the difference $D_B$ is positive, the spectrum $v_{B1}$ is extracted as the recovered spectrum y(ω,k) as shown in Equation (28):

$$y(\omega) = \begin{cases} v_{Al}(\omega) & \text{if } D_B < 0 \\ v_{Bl}(\omega) & \text{if } D_B > 0 \end{cases} \quad (28)$$

As described above, by comparing the overall split signal intensities $P_{A1}+P_{A2}$ and $P_{B1}+P_{B2}$, it is possible to select the recovered spectrum from the split spectra $v_{A1}$ and $v_{A2}$, which are generated from the separated signal $U_A$, and the split spectra $v_{B1}$ and $v_{B2}$, which are generated from the separated signal $U_B$.

When the intensity of the target speech spectrum $s_1$(ω,k) in a high frequency range (for example, 3.1–3.4 kHz) is originally small, the target speech spectrum intensity may become smaller than the noise spectrum intensity due to superposition of the background noise (for example, when the differences $D_A$ and $D_B$ are both positive, or when the differences $D_A$ and $D_B$ are both negative). In this case, the sum of two split spectra is obtained at each node. Then, whether the difference between the split spectra is positive or negative is determined at the node with the greater sum in order to examine permutation occurrence.

Figure 3:
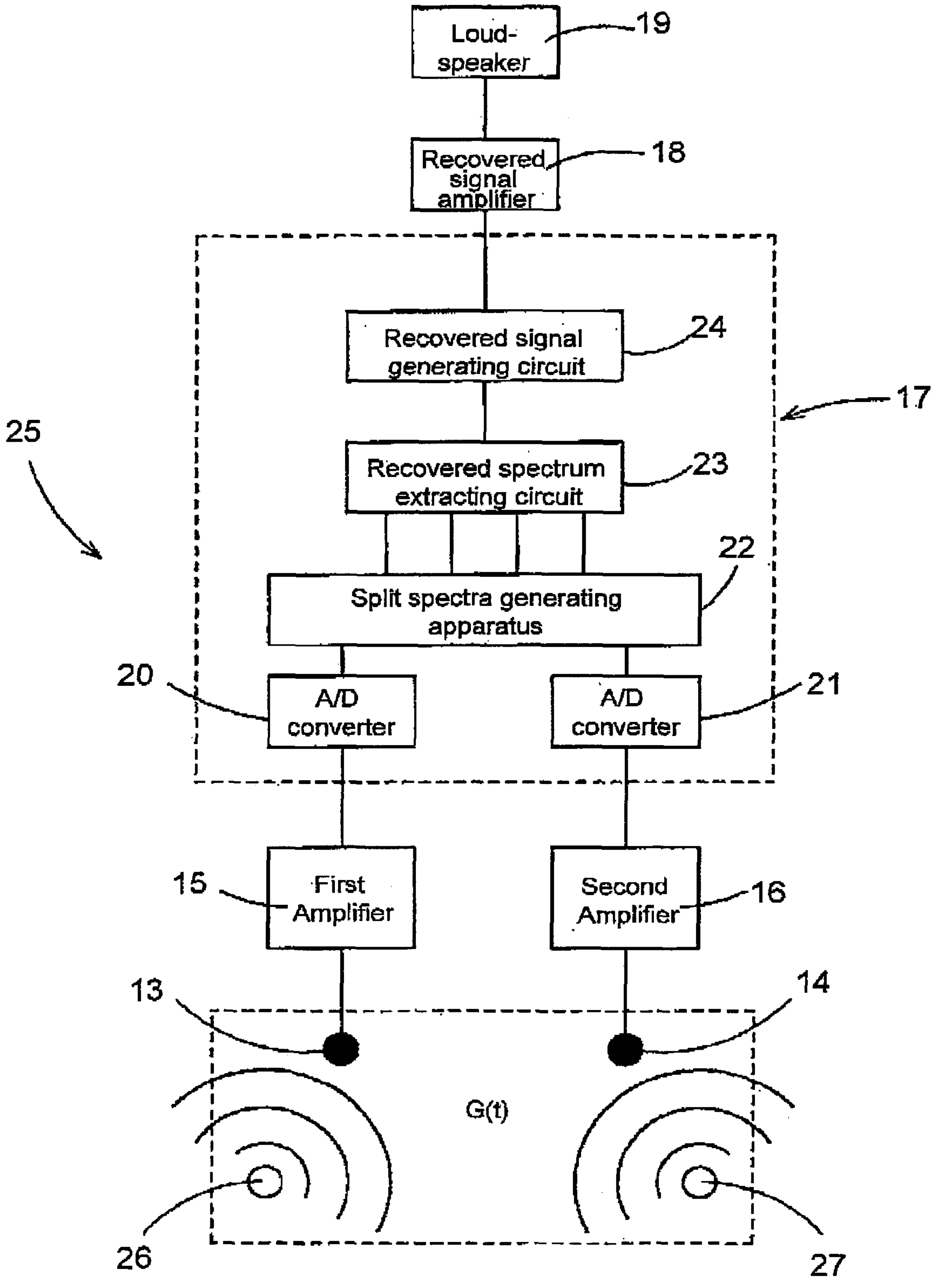
FIG. 3 is a block diagram showing a target speech recovering apparatus employing a method for recovering target speech based on split spectra using sound sources' locational information according to a second embodiment of the present invention.

FIG. 3 is a block diagram showing a target speech recovering apparatus employing a method for recovering target speech based on split spectra using sound sources' locational information according to a second embodiment of the present invention. A target speech recovering apparatus 25 receives signals transmitted from two sound sources 26 and 27 (unidentified sound sources, one of which is a target speech source and the other is a noise source) at the first microphone 13 and at the second microphone 14, which are provided at different locations, and outputs the target speech.

Since this target speech recovering apparatus 25 has practically the same structure as that of the target speech recovering apparatus 10, which employs the method for recovering target speech based on split spectra using sound sources' locational information according to the first embodiment of the present invention, the same components are represented with the same numerals and symbols, and detail explanations are omitted.

Figure 4:
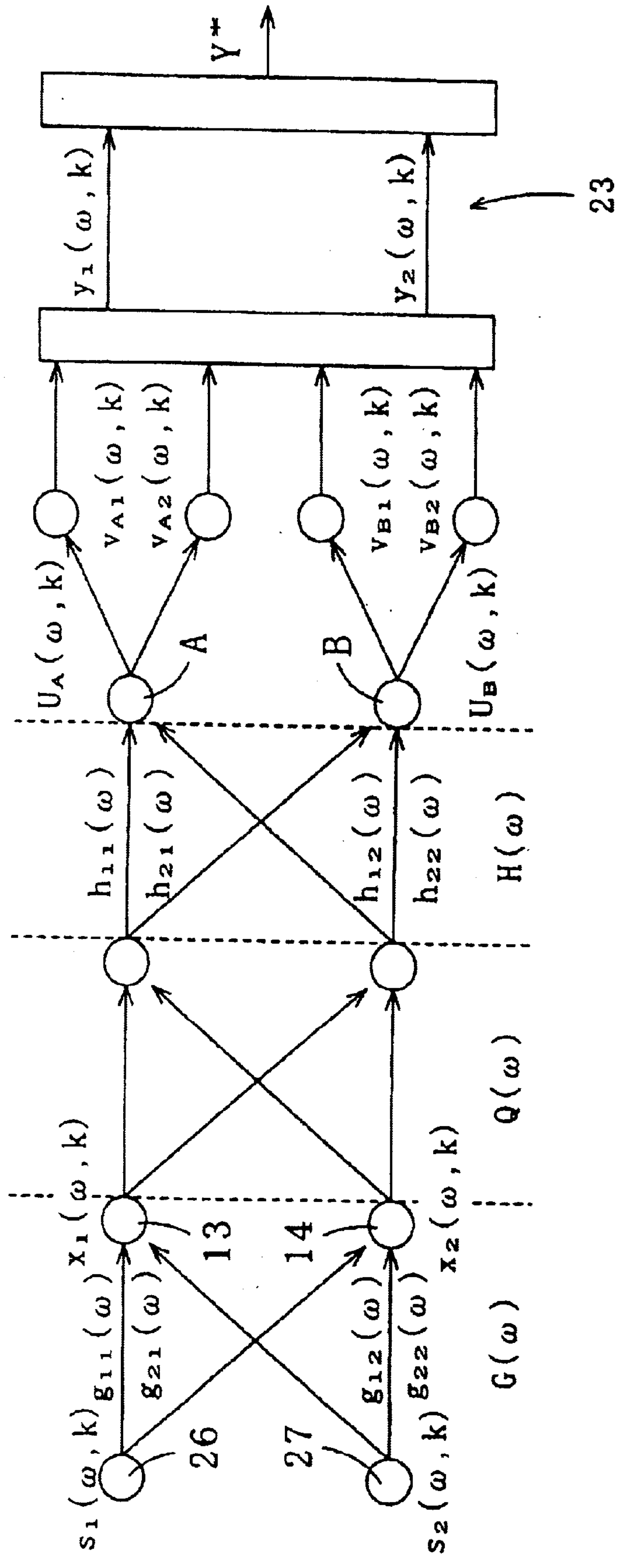
FIG. 4 is an explanatory view showing a signal flow in which a recovered spectrum of the target speech is generated from the target speech and noise in the method set forth in FIG. 3.

As shown in FIG. 4, the method according to the second embodiment of the present invention comprises: the first step of receiving signals $s_1(t)$ and $s_2(t)$ transmitted from the sound sources 26 and 27 respectively at the first microphone 13 and at the second microphone 14, and forming mixed signals $x_1(t)$ and $x_2(t)$ at the first and second microphones 13 and 14 respectively; the second step of performing the Fourier transform of the mixed signals $x_1(t)$ and $x_2(t)$ from the time domain to the frequency domain, decomposing the mixed signals into two separated signals $U_A$ and $U_B$ by means of the FastICA, and, based on transmission path characteristics of the four possible paths from the sound sources 26 and 27 to the first and second microphones 13 and 14, generating from the separated signal $U_A$ one pair of split spectra $v_{A1}$ and $v_{A2}$, which were received at the first and second microphones 13 and 14 respectively, and from the separated signal $U_B$ another pair of split spectra $v_{B1}$ and $v_{B2}$, which were received at the first and second microphones 13 and 14 respectively; and the third step of extracting estimated spectra corresponding to the respective sound sources to generate a recovered spectrum group Y* of the target speech, wherein the split spectra $v_{A1}$, $v_{A2}$, $v_{B1}$ and $v_{B2}$ are analyzed by applying criteria based on (i) signal output characteristics in the FastICA which outputs the split spectra corresponding to the target speech and the noise in the separated signals $U_A$ and $U_B$ respectively, and (ii) sound transmission characteristics that depend on the four different distances between the first and second microphones 13 and 14 and the sound sources 26 and 27 (i.e., spectrum intensity differences for each normalized frequency), and performing the inverse Fourier transform of the recovered spectrum group Y* from the frequency domain to the time domain to recover the target speech.

One of the notable characteristics of the method according to the second embodiment of the present invention is that it does not assume the target speech source 11 being closer to the first microphone 13 than to the second microphone 14 and the noise source 12 being closer to the second microphone 14 than to the first microphone 13 unlike the method according to the first embodiment. Therefore, the only difference is in the third step between the method according to the second embodiment and the method according to the first embodiment. Accordingly, only the third step of the method according to the second embodiment is described below.

Generally, the split spectra have two candidate spectra corresponding to a single sound source. For example, if there is no permutation, $v_{A1}$(ω,k) and $v_{A2}$(ω,k) are the two candidates for the single sound source, and, if there is permutation, $v_{B1}$(ω,k) and $v_{B2}$(ω,k) are the two candidates for the single sound source.

Due to the difference in sound intensities that depend on the four different distances between the first and second microphones and the two sound sources, spectral intensities of the obtained split spectra $v_{A1}(\omega,k)$, $v_{A2}(\omega,k)$, $v_{B1}(\omega,k)$, and $v_{B2}(\omega,k)$ for each frequency are different from one another. Therefore, if distinctive distances are provided between the first and second microphones 13 and 14 and the sound sources, it is possible to determine which microphone received which sound source's signal. That is, it is possible to identify the sound source for each of the split spectra $v_{A1}$, $v_{A2}$, $v_{B1}$, and $v_{B2}$.

Here, if there is no permutation, $v_{A1}(\omega,k)$ is selected as an estimated spectrum $y_1(\omega,k)$ of a signal from the one sound source that is closer to the first microphone 13 than to the second microphone 14. This is because the spectral intensity of $v_{A1}(\omega,k)$ observed at the first microphone 13 is greater than the spectral intensity of $v_{A2}(\omega,k)$ observed at the second microphone 14, and $v_{A1}(\omega,k)$ is less subject to the background noise than $v_{A2}(\omega,k)$. Also, if there is permutation, $v_{B1}(\omega,k)$ is selected as the estimated spectrum $y_1(\omega,k)$ for the one sound source. Therefore, the estimated spectrum $y_1(\omega,k)$ for the one sound source is expressed as in Equation (29):

$$y_1(\omega,k)=\begin{cases} v_{A1}(\omega,k) & \text{if } D_A>0, D_B<0 \\ v_{B1}(\omega,k) & \text{if } D_A<0, D_B>0 \end{cases} \tag{29}$$

Similarly for an estimated spectrum $y_2(\omega,k)$ for the other sound source, the spectrum $v_{B2}(\omega,k)$ is selected if there is no permutation, and the spectrum $v_{A2}(\omega,k)$ is selected if there is permutation as in Equation (30):

$$y_2(\omega,k)=\begin{cases} v_{A2}(\omega,k) & \text{if } D_A<0, D_B>0 \\ v_{B2}(\omega,k) & \text{if } D_A>0, D_B<0 \end{cases} \tag{30}$$

Incidentally, the permutation occurrence is determined by using Equations (21) and (22) as in the first embodiment.

Next, a case wherein a speaker is in a noisy environment is considered. In other words, out of the two sound sources, one sound source is the speaker and the other sound source is an unwanted noise. There is no a priori information as to which sound source corresponds to the speaker. That is, it is unknown whether the speaker is closer to the first microphone 13 or to the second microphone 14.

The FastICA method is characterized by its capability of sequentially separating signals from the mixed signals in descending order of non-Gaussianity. Speech generally has higher non-Gaussianity than noises. Thus, if observed sounds consist of the target speech (i.e., speaker's speech) and the noise, it is highly probable that a split spectrum corresponding to the speaker's speech is in the separated signal $U_A$, which is the first output of this method.

Therefore, if the one sound source is the speaker, the permutation occurrence is highly unlikely; and if the other sound source is the speaker, the permutation occurrence is highly likely. Therefore, if the permutation occurrence is determined for each normalized frequency and the number of occurrences is counted over all the frequencies, it is possible to select the recovered spectrum group (a speaker's speech spectrum group) Y*, based on the number of permutation occurrences, from the one sound source's estimated spectrum group $Y_1$ and the other sound source's estimated spectrum group $Y_2$, which were constructed from the estimated spectra $y_1$ and $y_2$ respectively. This procedure is expressed in Equation (31):

$$Y^*=\begin{cases} Y_1 & \text{if } N^+>N^- \\ Y_2 & \text{if } N^+<N^- \end{cases} \tag{31}$$

where $N^+$ is the number of occurrences when $D_A$ is positive and $D_B$ is negative, and $N^-$ is the number of occurrences when $D_A$ is negative and $D_B$ is positive.

Thereafter, by performing the inverse Fourier transform of the estimated spectrum group $Y_i=\{y_i(\omega,k)|k=0, 1, \ldots, K-1\}$ $(i=1,2)$ constituting the recovered spectrum group Y* back to the time domain for each frame and by taking the summation over all the frames as in Equation (24), the recovered signal y(t) of the target speech is obtained. As can be seen from the above procedure, the amplitude ambiguity and the permutation can be prevented in recovering the speaker's speech.

In a first modification of the method for recovering target speech based on split spectra using sound sources' locational information according to the second embodiment, the difference $D_A$ at the node A is calculated as a difference between the spectrum $v_{A1}$'s mean square intensity $P_{A1}$ and the spectrum $v_{A2}$'s mean square intensity $P_{A2}$, and the difference $D_B$ is calculated as a difference between the spectrum $v_{B1}$'s mean square intensity $P_{B1}$ and the spectrum $v_{B2}$'s mean square intensity $P_{B2}$. Here, Equation (25) as in the first embodiment may be used to calculate the mean square intensities $P_{A1}$ and $P_{A2}$, and hence the estimated spectra $y_1(\omega,k)$ and $y_2(\omega,k)$ for the one sound source and the other sound source are expressed as in Equations (32) and (33), respectively:

$$y_1(\omega)=\begin{cases} v_{A1}(\omega) & \text{if } D_A>0, D_B<0 \\ v_{B1}(\omega) & \text{if } D_A<0, D_B>0 \end{cases} \tag{32}$$

$$y_2(\omega)=\begin{cases} v_{A2}(\omega) & \text{if } D_A<0, D_B>0 \\ v_{B2}(\omega) & \text{if } D_A>0, D_B<0 \end{cases} \tag{33}$$

Therefore, if the permutation occurrence is determined for each normalized frequency by using Equations (32) and (33) and the number of occurrences is counted over all the frequencies, it is possible to select the recovered spectrum group (a speaker's speech spectrum group) Y*, based on the number of permutation occurrences, from the one sound source's estimated spectrum group $Y_1$ and the other sound source's estimated spectrum group $Y_2$, which were constructed from the estimated spectra $y_1$ and $y_2$ respectively. This procedure is expressed in Equation (31).

In a second modification of the method according to the second embodiment, the criteria are obtained as follows. Namely, if the one sound source 26 is closer to the first microphone 13 than to the second microphone 14 and if the other sound source 27 is closer to the second microphone 14 than to the first microphone 13, the criteria are constructed by calculating the mean square intensities $P_{A1}$, $P_{A2}$, $P_{B1}$ and $P_{B2}$ of the spectra $v_{A1}$, $v_{A2}$, $v_{B1}$ and $v_{B2}$, respectively; calculating a difference $D_A$ between the mean square intensities $P_{A1}$ and $P_{A2}$ and a difference $D_B$ between the mean square intensities $P_{B1}$ and $P_{B2}$; and if $P_{A1}+P_{A2}>P_{B1}+P_{B2}$ and if the difference $D_A$ is positive, extracting the spectrum $v_{A1}$ as the one sound source's estimated spectrum $y_1(\omega,k)$, or if $P_{A1}+P_{A2}>P_{B1}+P_{B2}$ and if the difference $D_A$ is negative, extracting the spectrum $v_{B1}$ as the one sound source's estimated spectrum $y_1(\omega,k)$ as shown in Equation (34):

$$y_1(\omega)=\begin{cases} v_{A1}(\omega) & \text{if } D_A>0 \\ v_{B1}(\omega) & \text{if } D_A<0 \end{cases} \tag{34}$$

Also, if $P_{A1}+P_{A2}>P_{B1}+P_{B2}$ and if the difference $D_A$ is negative, the $v_{A2}$ is extracted as the other sound source's estimated spectrum $y_2(\omega,k)$, or if $P_{A1}+P_{A2}>P_{B1}+P_{B2}$ and if the difference $D_A$ is positive, the $v_{B2}$ is extracted as the other sound source's estimated spectrum $y_2(\omega,k)$ as shown in Equation (35):

$$y_2(\omega)=\begin{cases} v_{A2}(\omega) & \text{if } D_A<0 \\ v_{B2}(\omega) & \text{if } D_A>0 \end{cases} \tag{35}$$

If $P_{A1}+P_{A2}<P_{B1}+P_{B2}$ and if the difference $D_B$ is negative, the spectrum $v_{A1}$ is extracted as the one sound source's estimated spectrum $y_1(\omega,k)$, or if $P_{A1}+P_{A2}<P_{B1}+P_{B2}$ and if the difference $D_B$ is positive, the spectrum $v_{B1}$ is extracted as the one sound source's estimated spectrum $y_1(\omega,k)$ as shown in Equation (36):

$$y_1(\omega)=\begin{cases} v_{A1}(\omega) & \text{if } D_B<0 \\ v_{B1}(\omega) & \text{if } D_B>0 \end{cases} \tag{36}$$

Also, if $P_{A1}+P_{A2}<P_{B1}+P_{B2}$ and if the difference $D_B$ is positive, $v_{A2}$ is extracted as the other sound source's estimated spectrum $y_2(\omega,k)$, or if $P_{A1}+P_{A2}<P_{B1}+P_{B2}$ and if the difference $D_B$ is negative, $v_{B2}$ is extracted as the other sound source's estimated spectrum $y_2(\omega,k)$ as shown in Equation (37);

$$y_2(\omega)=\begin{cases} v_{A2}(\omega) & \text{if } D_B>0 \\ v_{B2}(\omega) & \text{if } D_B<0 \end{cases} \tag{37}$$

Therefore, if the permutation occurrence is determined for each normalized frequency by using Equations (34)-(37) and the number of occurrences is counted over all the frequencies, it is possible to select the recovered spectrum group (a speaker's speech spectrum group) Y*, based on the number of permutation occurrences, from the one sound source's estimated spectrum group $Y_1$ and the other sound source's estimated spectrum group $Y_2$, which were constructed from the estimated spectra $y_1$ and $y_2$ respectively. This procedure is expressed in Equation (31).

EXAMPLES

Data collection was made with 8000 Hz sampling frequency, 16 Bit resolution, 16 msec frame length, and 8 msec frame interval, and by use of the Hamming window for the window function. Data processing was performed for a frequency range of 300-3400 Hz, which corresponds to telephone speech quality, by taking microphone frequency characteristics into account. As for the separated signals, the nonlinear function in the form of Equation (38):

$$f(|u_n(\omega,k)|^2)=1-2\big/\left(e^{2|u_n(\omega,k)|^2}+1\right) \tag{38}$$

was used, and the FastICA algorithm was carried out with random numbers in the range of (−1,1) for initial weights, iteration up to 1000 times, and a convergence condition CC>0.999999.

Figure 5:
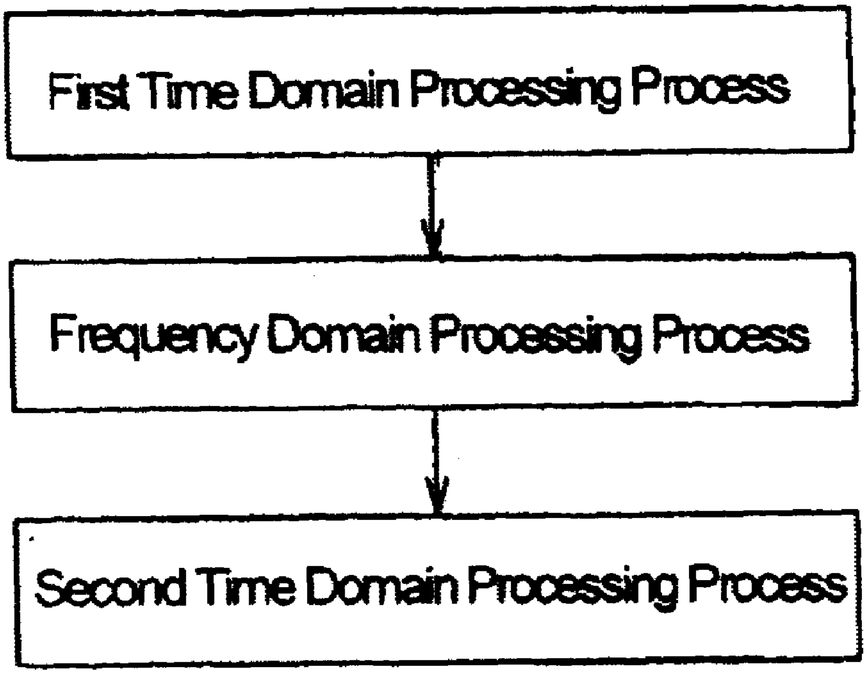
FIG. 5 is an explanatory view showing an overview of procedures in the methods for recovering target speech according to Examples 1–5.

As shown in FIG. 5, the method for recovering the target speech in Examples 1-5 comprises: a first time domain processing process for pre-processing the mixed signals so that the Independent Component Analysis can be applied; a frequency domain processing process for obtaining the recovered spectrum in the frequency domain by use of the FastICA from the mixed signals which were divided into short time intervals; and a second time domain processing process for outputting the recovered spectrum of the target speech by converting the recovered spectrum obtained in the frequency domain back to the time domain.

Figure 6:
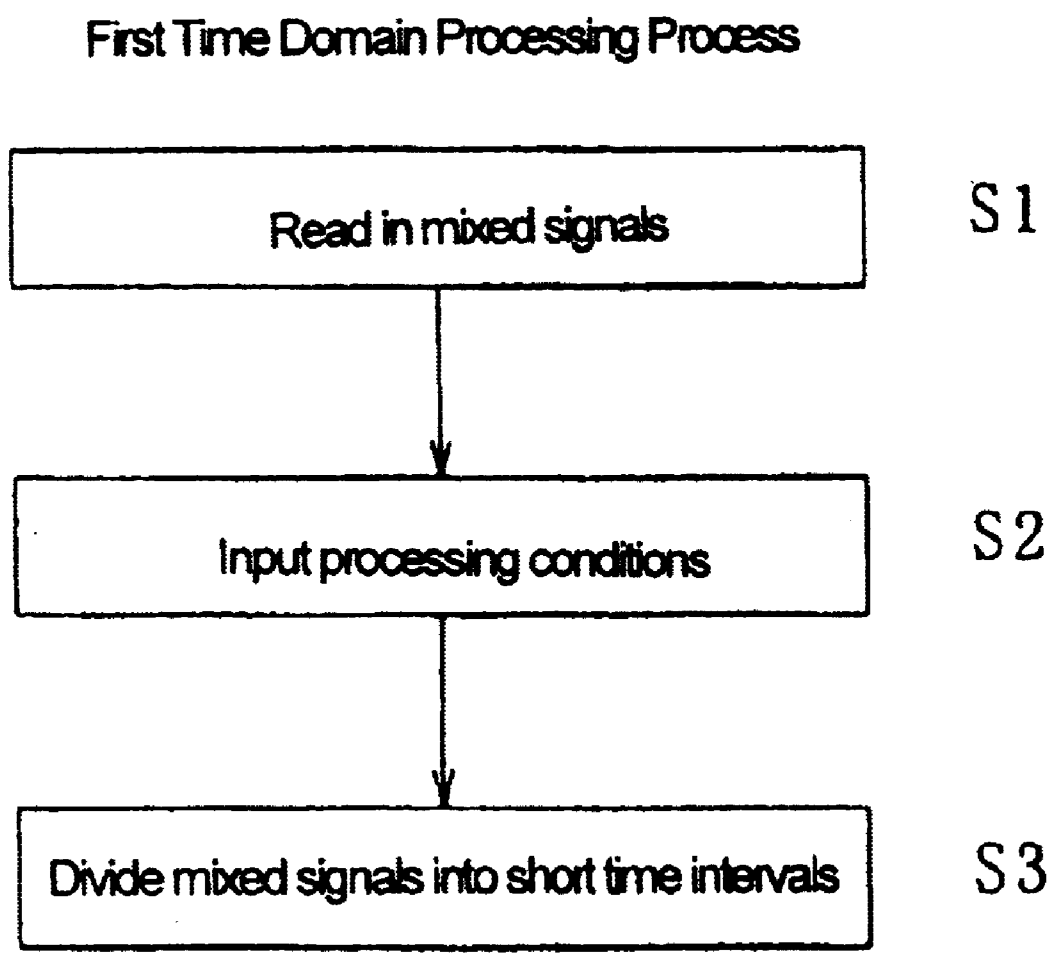
FIG. 6 is an explanatory view showing procedures in each part of the methods set forth in FIG. 5 according to Examples 1–5.

In the first time domain processing process, as shown in FIG. 6, (S1) the mixed signals are read in, (S2) a processing condition for dividing the mixed signals into the short time intervals (frames) in the time domain is entered, (S3) and the mixed signals are divided into the short time intervals with the Fourier transform. With this sequence, the mixed signals are converted from the time domain to the frequency domain for each frame.

Figure 7:
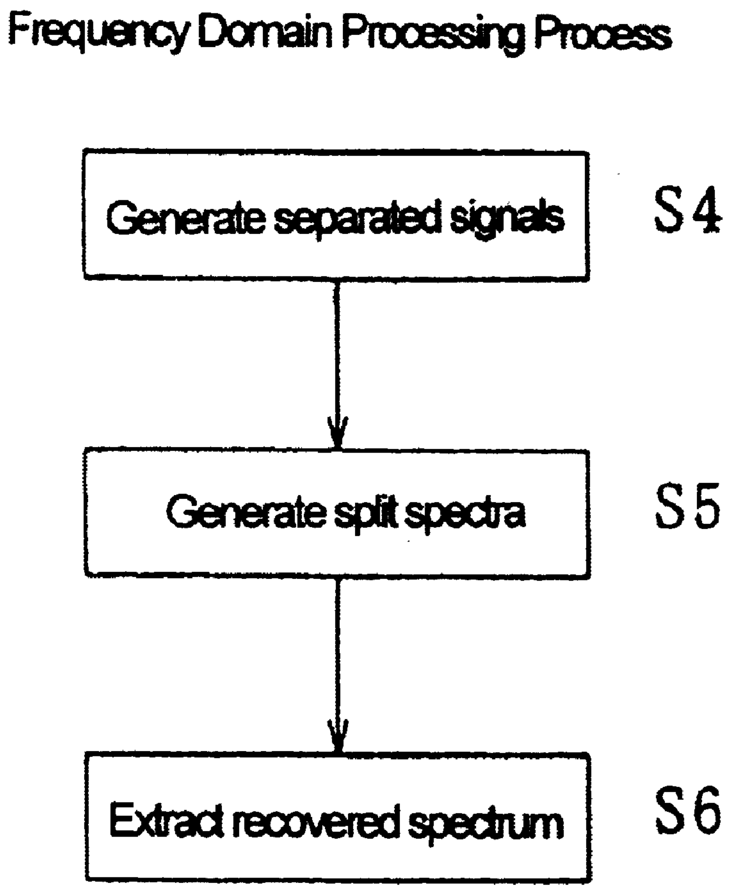
FIG. 7 is an explanatory view showing procedures in each part of the methods set forth in FIG. 5 according to Examples 1–5.

In the frequency domain processing process, as shown in FIG. 7, (S4) the mixed signals converted into the frequency domain are whitened and the separated signals are generated, (S5) the split spectra are generated by using the FastICA algorithm for the obtained separated signals, and (S6) the permutation is determined by applying predetermined criteria to the separated signals, and the recovered spectrum is extracted under a predetermined frequency restriction condition. With this sequence, the recovered signal of only the target speech can be outputted in the frequency domain.

Figure 8:
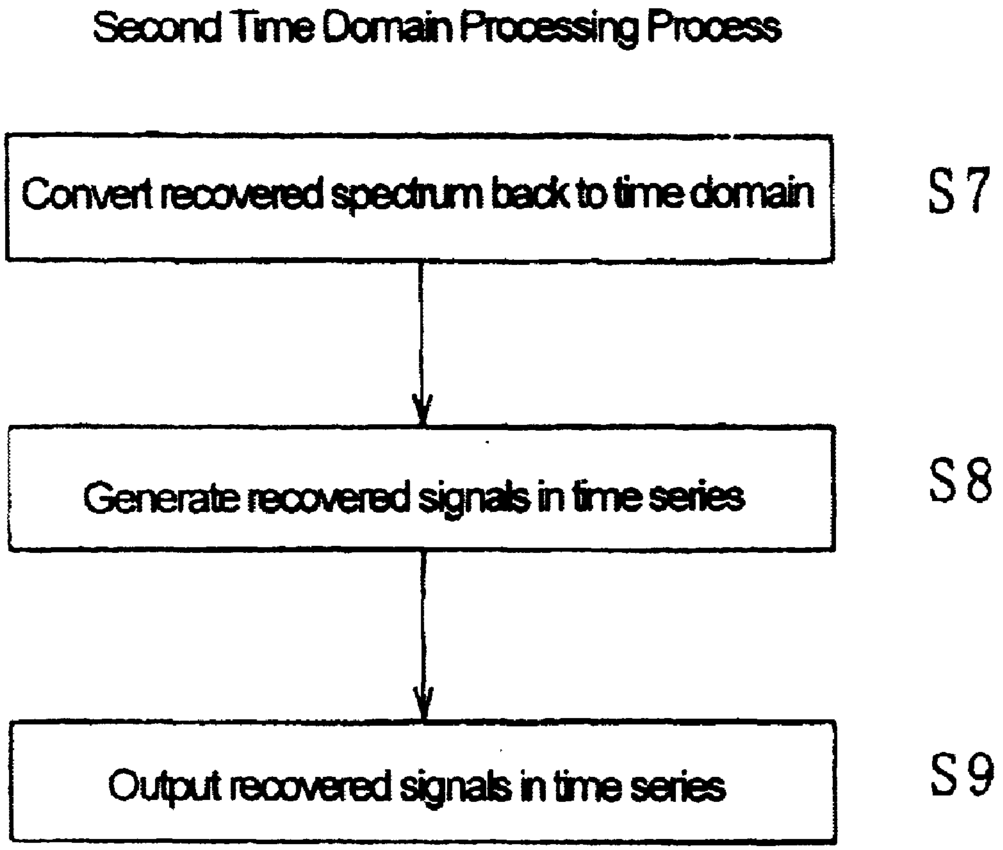
FIG. 8 is an explanatory view showing procedures in each part of the methods set forth in FIG. 5 according to Examples 1–5.

In the second time domain processing process, as shown in FIG. 8, (S7) the inverse Fourier transform of the recovered spectrum extracted as above is performed for each frame from the frequency domain to the time domain, (S8) the recovered signals are generated in time series, and (S9) the result is outputted. With this sequence, the recovered signal of the target speech is obtained.

1. Example 1

An experiment for recovering the target speech was conducted in a room with 7.3 m length, 6.5 m width, 2.9 m height, about 500 msec reverberation time and 48.0 dB background noise level.

Figure 9:
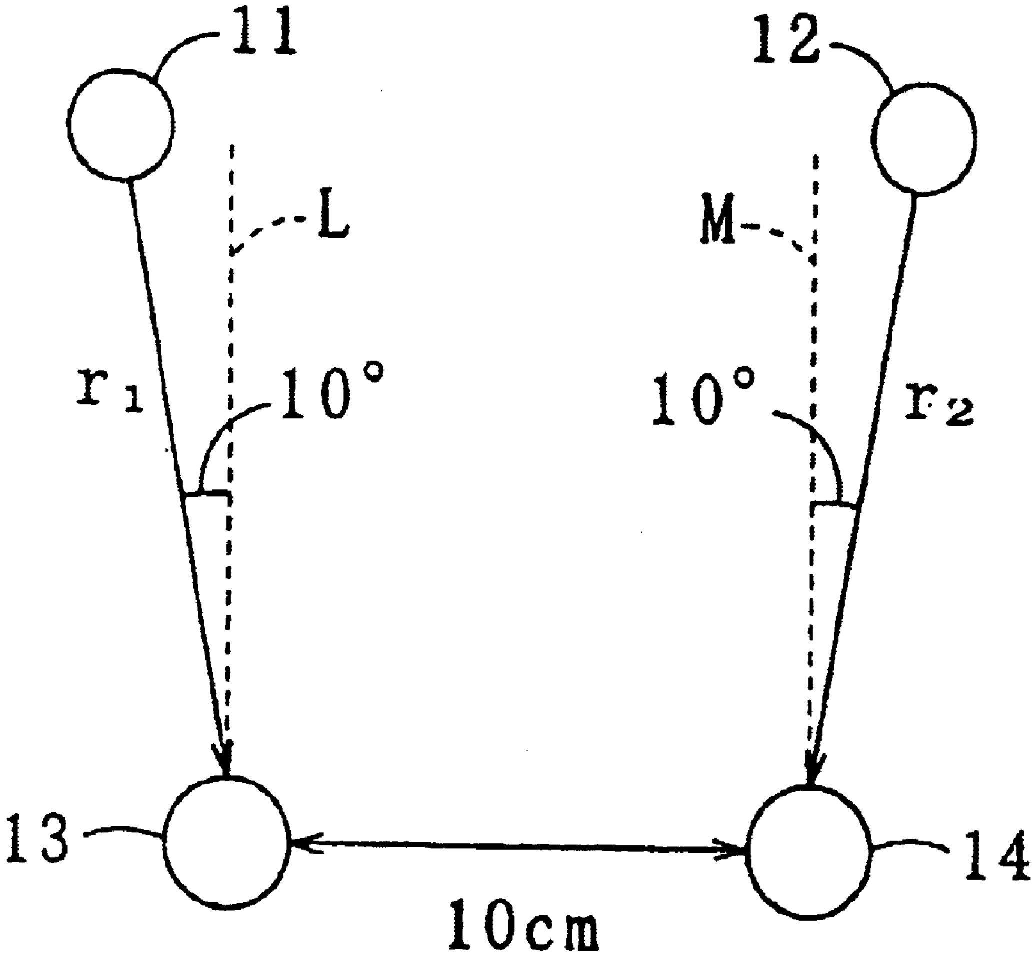
FIG. 9 is an explanatory view showing a locational relationship of a first microphone, a second microphone, a target speech source, and a noise source in Examples 1–3.

As shown in FIG. 9, the first microphone 13 and the second microphone 14 are placed 10 cm distance apart. The target speech source 11 is placed at a location $r_1$ cm from the first microphone 13 in a direction 10° outward from a line L, which originates from the first microphone 13 and which is normal to a line connecting the first and second microphones 13 and 14. Also the noise source 12 is placed at a location $r_2$ cm from the second microphone 14 in a direction 10° outward from a line M, which originates from the second microphone 14 and which is normal to a line connecting the first and second microphones 13 and 14. Microphones used here are unidirectional capacitor microphones (OLYMPUS ME12) and have a frequency range of 200-5000 Hz.

First, a case wherein the noise is speech of speakers other than a target speaker is considered by using 6 speakers (3 males and 3 females) in the experiment for extracting the target speech (target speaker speech).

As in FIG. 9, the target speaker spoke words at $r_1$=10 cm from the first microphone 13 and another speaker as a noise source spoke different words at $r_2$=10 cm from the second microphone 14. For the sake of easing visual inspection of permutation at each frequency, the words were in 3 patterns of a short and a long speech lengths combination "Tokyo, Kinki-daigaku", "Shin-iizuka, Sangyo-gijutsu-kenkyuka" and "Hakata, Gotanda-kenkyu-shitsu", and then these 3 patterns were switched around. Thereafter, the above process was repeated by switching the above two speakers to record the mixed signals for total of 12 patterns. Furthermore, one of the two speakers was left unchanged and the other speaker was switched with another speaker selected from the remaining 4 speakers. The whole process was repeated to collect mixed signals corresponding to a total of $180(=12\times{}_6C_2)$ speech patterns. The length of the above data varied from the shortest of about 2.3 sec to the longest of about 4.1 sec.

In the present example, the degree of permutation resolution was visually determined. The results were shown in Table 2. First, in comparative examples wherein the conventional FastICA is used, an average permutation resolution rate for the separated signals was 50.60%. Since signals are sequentially separated in descending order of non-Gaussianity in the FastICA, and since the experimental subjects here are both speaker's speech which is highly non-Gaussian, it is not surprising that the permutation is not resolved at all in this method.

In contrast, when the criteria in Equation (26) were applied, the average permutation resolution rate was 93.3%, an about 40% improvement against the comparative examples as shown in Table 2.

TABLE 2

| Component Displacement Resolution Rate (%) | Male | Female | Average |
|---|---|---|---|
| Comparative Examples | 48.43 | 52.77 | 50.60 |
| Example 1 | 93.38 | 93.22 | 93.30 |
| Example 2 | 98.74 | 99.43 | 99.08 |

2. Example 2

Data collection was made in the same condition as in Example 1, and the target speech was recovered using the criteria in Equation (26) as well as Equations (27) and (28) for frequencies to which Equation (26) is not applicable.

The results were shown in Table 2. The average resolution rate was 99.08%: the permutation was resolved extremely well.

FIG. 10 shows the experimental results obtained by applying the above criteria for a case in which a male speaker as a target speech source and a female speaker as a noise source spoke "Sangyo-gijutsu-kenkyuka" and "Shin-iizuka", respectively. FIGS. 10A and 10B show the mixed signals observed at the first and second microphones 13 and 14, respectively. FIGS. 10C and 10D show the signal wave forms of the male speaker's speech "Sangyo-gijutsu-kenkyuka" and the female speaker's speech "Shin-iizuka" respectively, which were obtained from the recovered spectra according to the present method with the criteria in Equations (26), (27) and (28). FIGS. 10E and 10F show the signal wave forms of the target speech "Sangyo-gijutsu-kenkyuka" and the noise "Shin-iizuka" respectively, which were obtained from the separated signals by use of the conventional method (FastICA).

Figure 10A:
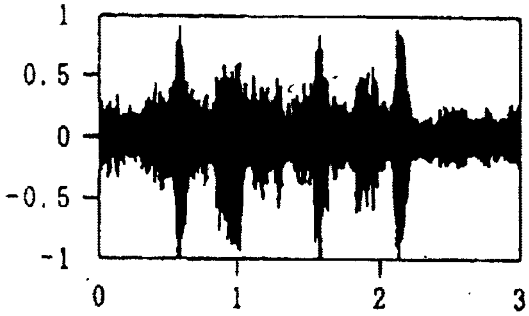
FIGS. 10A and 10B are graphs showing mixed signals received at the first and second microphones, respectively, in Example 2.
Figure 10B:
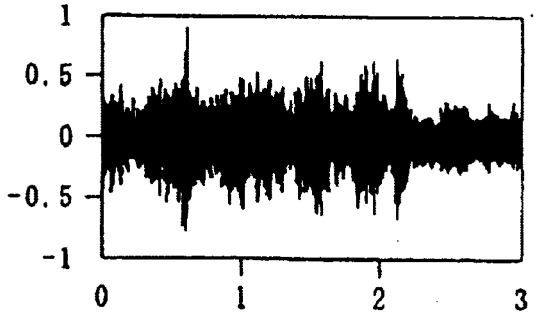
Figure 10C:
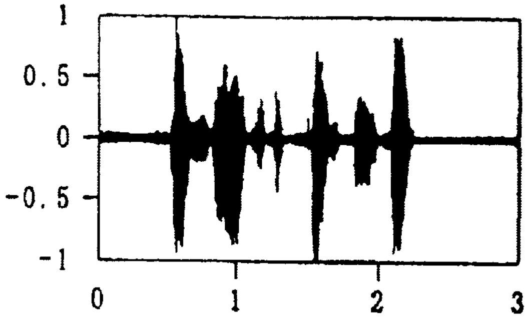
FIGS. 10C and 10D are graphs showing signal waveforms of the recovered target speech and noise, respectively, in the present method in Example 2.
Figure 10D:
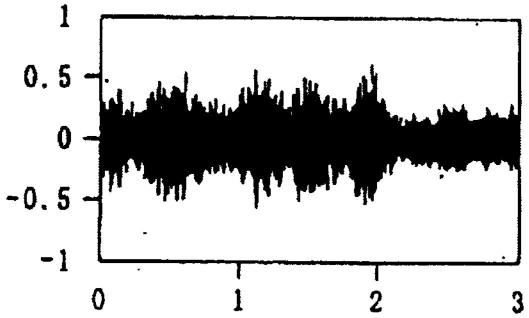
Figure 10E:
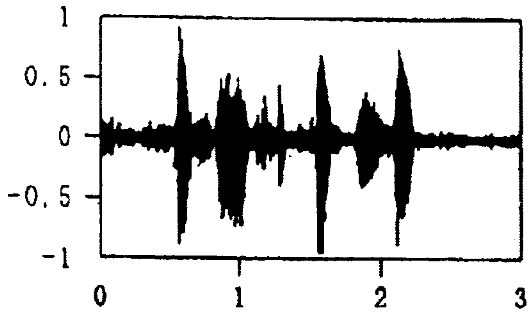
FIGS. 10E and 10F are graphs showing signal waveforms of the recovered target speech and noise, respectively, in a conventional method in Example 2.
Figure 10F:
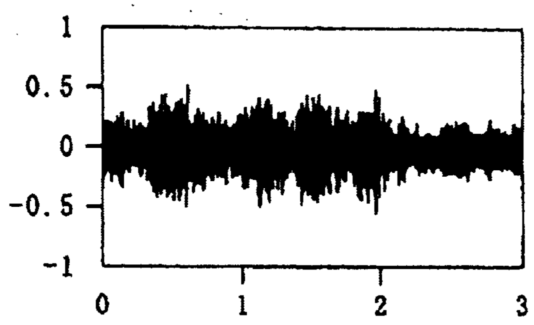
Figure 11A:
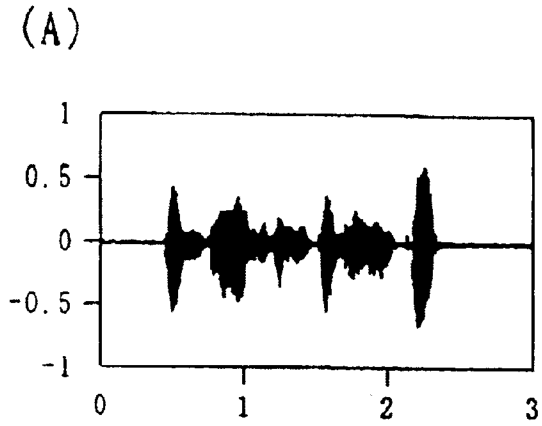
FIGS. 11A and 11B are graphs showing mixed signals received at the first and second microphones, respectively, in Example 3.
Figure 11B:
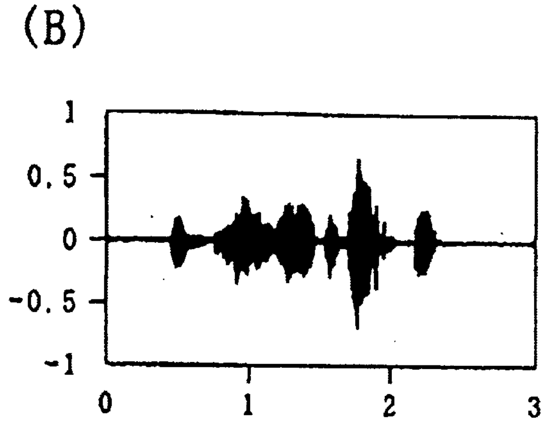
Figure 11C:
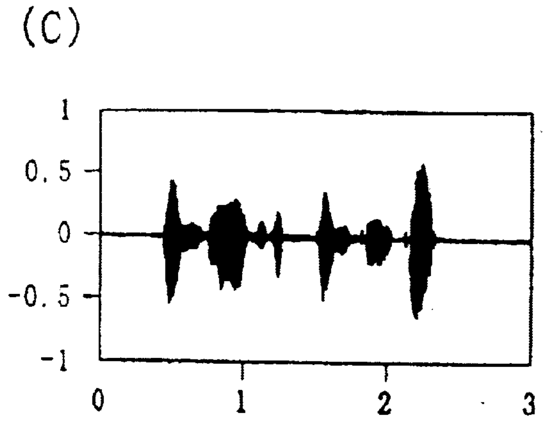
FIGS. 11C and 11D are graphs showing signal waveforms of the recovered target speech and noise, respectively, in the present method in Example 3.
Figure 11D:
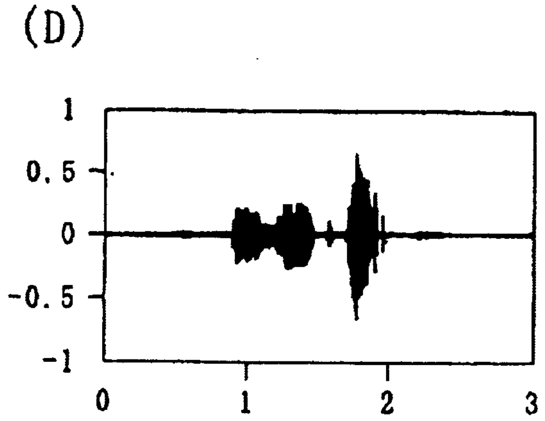
Figure 11E:
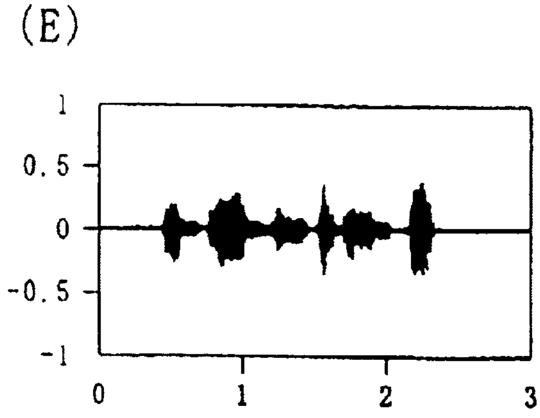
FIGS. 11E and 11F are graphs showing signal waveforms of the recovered target speech and noise, respectively, in a conventional method in Example 3.
Figure 11F:
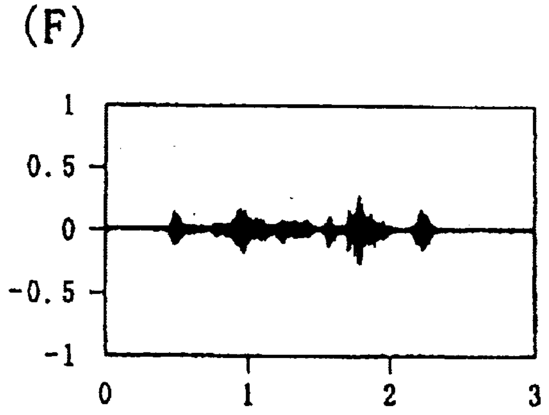

FIGS. 10C and 10D show that speech durations of the male speaker and the female speaker differ from each other, and the permutation is visually nonexistent. But the speech durations are nearly the same according to the conventional method as shown in FIGS. 10E and 10F, and it was difficult to identify speech speakers.

Also, examinations on recovered signals' auditory clarity indicated that the present method recovered a clear target speech with almost no mixing of the other speech, whereas the conventional method recovered signals containing both speakers' speech, revealing a distinctive difference in recovering accuracy.

3. Example 3

In FIG. 9, a loudspeaker emitting "train station noises" was placed at the noise source 12, and each of 8 speakers (4 males and 4 females) spoke each of 4 words: "Tokyo", "Shin-iizuka", "Kinki-daigaku" and "Sangyo-gijutsu-kenkyuka" at the target speech source 11 with $r_1$=10 cm. This experiment was conducted with the noise source 12 at $r_2$=30 cm and $r_2$=60 cm to obtain 64 sets of data. The average noise levels during this experiment were 99.5 dB, 82.1 dB and 76.3 dB at locations 1 cm, 30 cm and 60 cm from the loudspeaker respectively. The data length varied from the shortest of about 2.3 sec to the longest of about 6.9 sec.

FIG. 11 shows the results for $r_1$=10 cm and $r_2$=30 cm, when a male speaker (target speech source) spoke "Sangyo-gijutsu-kenkyuka" and the loudspeaker emitted the "train station noises". FIGS. 11A and 11B show the mixed signals received at the first and second microphones 13 and 14, respectively. FIGS. 11C and 11D show the signal wave forms of the male speaker's speech "Sangyo-gijutsu-kenkyuka" and the "train station noises" respectively, which were obtained from the recovered spectra according to the present method with the criteria in Equations (26), (27) and (28). FIGS. 11E and 11F show the signal wave shapes of the speech "Sangyo-gijutsu-kenkyuka" and the "train station noises" respectively, which were obtained from the separated signals by use of the conventional method (FastICA). In comparing FIGS. 11C and 11E, one notices that the noises are removed well in the target signal recovered by the present method, but some degree of noise remain in the signal recovered by the conventional method.

Table 3 shows the permutation resolution rates. This table shows that resolution rates of about 90% were obtained even when the conventional method was used. This is because of the high non-Gaussianity of speakers' speech and an advantage of the conventional method that separates signals in descending order of non-Gaussianity. In this Example 3, the permutation resolution rates in the present method exceed those in the conventional method by about 3–8% on average.

TABLE 3

| Distance $r_2$ | | 30 cm | 60 cm | Average |
|---|---|---|---|---|
| Example 3 | Male | 93.63 | 98.77 | 96.20 |
| | Female | 92.89 | 97.06 | 94.98 |
| | Average | 93.26 | 97.92 | 95.59 |
| Comparative Example | Male | 87.87 | 89.95 | 88.91 |
| | Female | 91.67 | 91.91 | 91.79 |
| | Average | 89.77 | 90.93 | 90.35 |

Also, examinations on recovered speech's clarity in Example 3 indicated that, although there was small noise influence when there was no speech, there was nearly no noise influence when there was speech. On the other hand, the recovered speech in the conventional method had heavy noise influence. In order to clarify the above difference, the permutation occurrence was examined for different frequency bands. The result indicated that the permutation occurrence is independent of the frequency band in the conventional method, but is limited to frequencies where the spectrum intensity is very small in the present method. Thus this also contributes to the above difference in auditory clarity between the two methods.

4. Example 4

Figure 12:
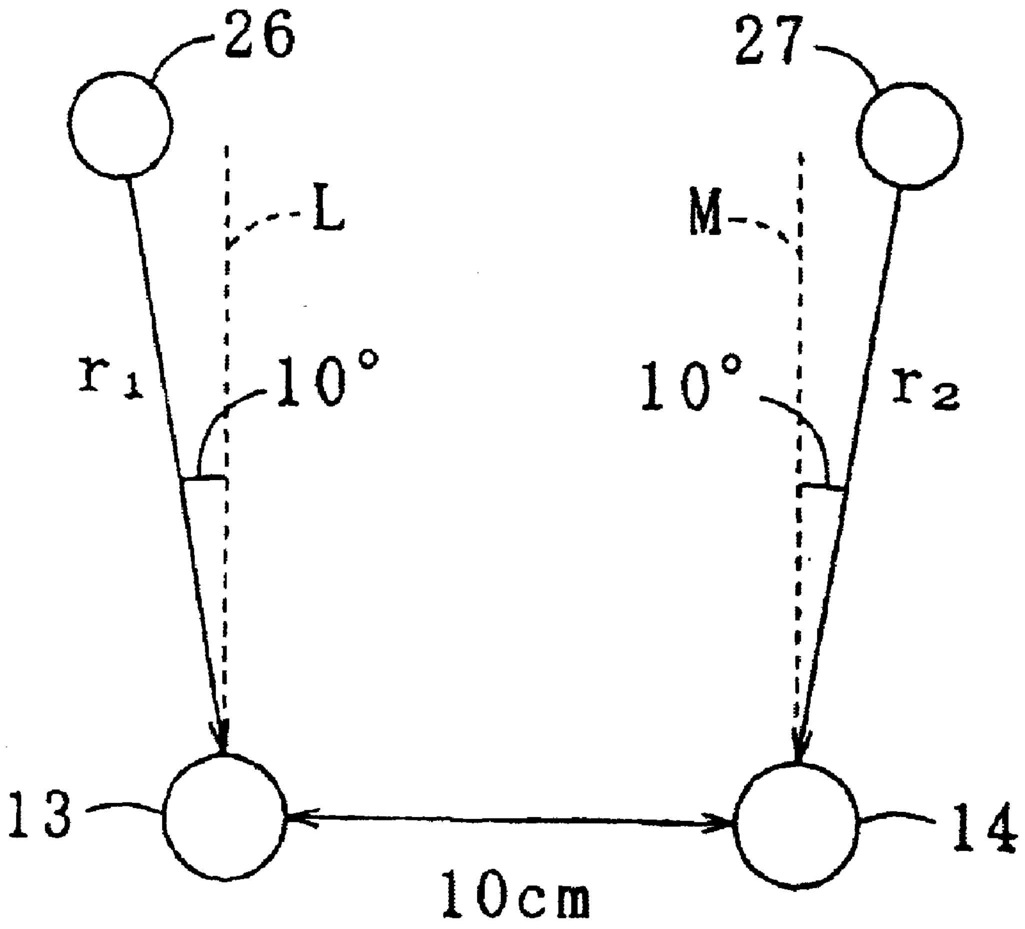
FIG. 12 is an explanatory view showing a locational relationship of a first microphone, a second microphone, and two sound sources in Examples 4 and 5.

As shown in FIG. 12, the first microphone 13 and the second microphone 14 are placed 10 cm distance apart. The first sound source 26 is placed at a location $r_1$ cm from the first microphone 13 in a direction 10° outward from a line L, which originates from the first microphone 13 and which is normal to a line connecting the first and second microphones 13 and 14. Also the second sound source 27 is placed at a location $r_2$ cm from the second microphone 14 in a direction 10° outward from a line M, which originates from the second microphone 14 and which is normal to a line connecting the first and second microphones 13 and 14. Data collection was made in the same condition as in Example 1.

In FIG. 12, a loudspeaker was placed at the second sound source 27, emitting train station noises including human voices, sound of train departure, station worker's whistling signal for departure, sound of trains in motion, melody played for train departure, and announcements from loudspeakers in the train station. At the first sound source 26 with $r_1$=10 cm, each of 8 speakers (4 males and 4 females) spoke each of 4 words: "Tokyo", "Shin-iizuka", "Kinki-daigaku" and "Sangyo-gijutsu-kenkyuka". This experiment was conducted for $r_2$=30 cm and $r_2$=60 cm to obtain 64 sets of data. The average noise levels during this experiment were 99.5 dB, 82.1 dB and 76.3 dB at locations 1 cm, 30 cm and 60 cm from the loudspeaker, respectively. The data length varied from the shortest of about 2.3 sec to the longest of about 6.9 sec.

The method for recovering target speech shown in FIG. 5 was used for the above 64 sets of data to recover the target speech. The criteria, which first resolve the permutation based on Equations (34)-(37) followed by Equation (31), were employed. The results on extraction rates are shown in Table 4. Here, the extraction rate is defined as C/64, where C is the number of times the target speech was accurately extracted.

TABLE 4

| | Distance $r_2$ (cm) | |
|---|---|---|
| Extraction Rate (%) | 30 | 60 |
| Example 4 | 100 | 100 |
| Comparative Example | 87.5 | 96.88 |

As can be seen in Table 4, in the method by use of the criteria based on Equations (34)-(37) followed by Equation (31), the target speech was extracted with 100% accuracy regardless of the distance $r_2$.

Table 4 also shows a comparative example wherein the mode values of the recovered signals y(t), which are the inverse Fourier transform of the recovered spectrum y(ω,k) obtained by applying the criteria in Equation (26) or Equations (27) and (28) for the frequencies that Equation (26) is not applicable to, were calculated and a signal with the largest mode value is extracted as the target speech. In the comparative example, the extraction rates of the target speech were 87.5% and 96.88% when $r_2$ was 30 cm and 60 cm, respectively. This indicates that the extraction rate is influenced by $r_2$ (distance between the noise source and the second microphone 14), that is, by the noise level. Therefore, the present method by use of the criteria in Equations (34)-(37) followed by Equation (31) was confirmed robust even for different noise levels.

5. Example 5

In order to examine if the sequence of speech from two sound sources is accurately obtained, data collection was made as follows for the case of two sound sources being both speakers.

In FIG. 12, one speaker spoke "a word" at the sound source 26 with $r_1$=10 cm and the other speaker spoke "another word" at the sound source 27 with $r_2$=10 cm. Next, after switching the two speakers, each speaker spoke the same word as before. This procedure was repeated with 6 speakers (3 males and 3 females) and 3 word pairs "Tokyo, Kinki-daigaku", "Shin-iizuka, Sangyo-gijutsu-kenkyuka" and "Hakata, Gotanda-kenkyu-shitsu" to collect 180 sets of mixed signals. The speech time length was 2.3-4.1 sec.

The permutation resolution rate was 50.6% when the conventional method (FastICA) was used. In contrast, the permutation resolution rate was 99.08%, when the method for recovering target speech shown in FIG. 5 was employed with the criteria in Equations (34)-(37) followed by Equation (31). Therefore, it is proven that the present method is capable of effectively extracting target speech even when both sound sources are speakers.

Figure 13A:
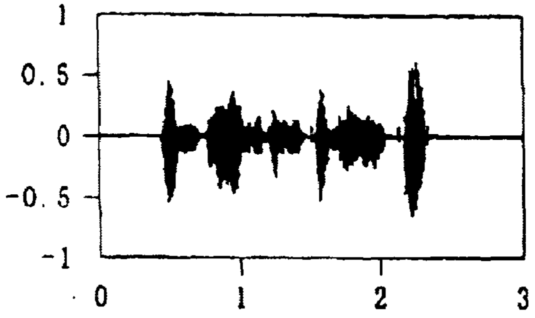
FIGS. 13A and 13B are graphs showing mixed signals received at the first and second microphones, respectively, in Example 5.
Figure 13B:
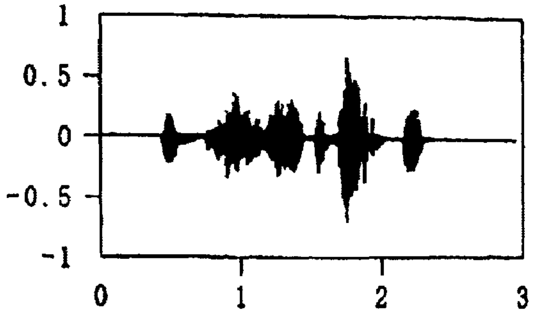
Figure 13C:
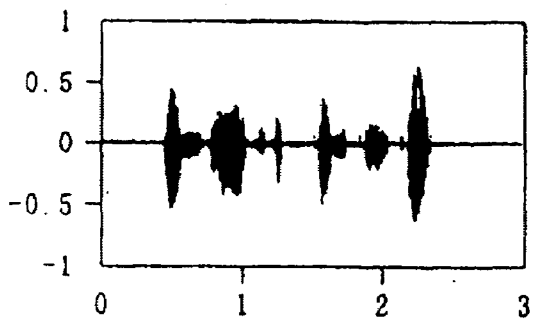
FIGS. 13C and 13D are graphs showing signal waveforms of the recovered target speech and noise, respectively, in the present method in Example 5.
Figure 13D:
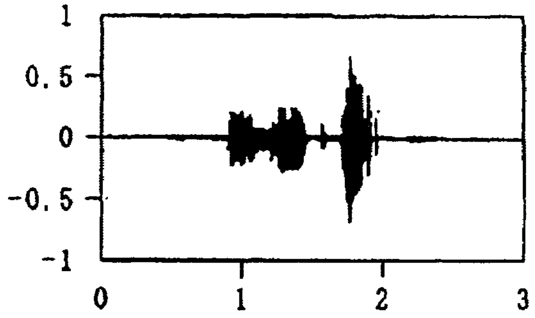
Figure 13E:
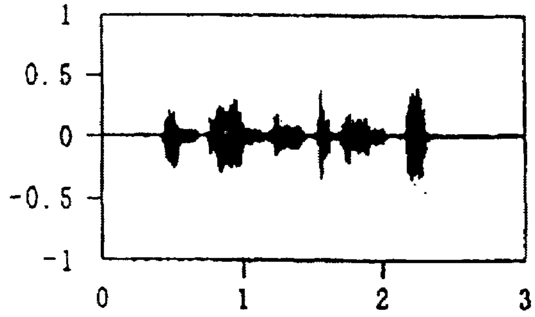
FIGS. 13E and 13F are graphs showing signal waveforms of the recovered target speech and noise, respectively, in a conventional method in Example 5.
Figure 13F:
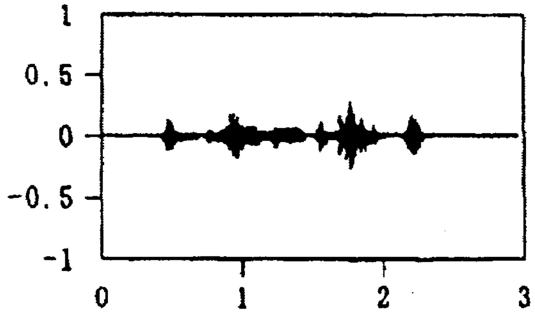

Also, it was confirmed that the sequence of speech from the two sound sources was accurately obtained for all data. One example is shown in FIG. 13, which shows the recovered speech for the case wherein a male speaker spoke "Sangyo-gijutsu-kenkyuka" at the sound source 26 with $r_1$=10 cm, and a female speaker spoke "shin-iizuka" at the sound source 27 with $r_2$=10 cm. FIGS. 13A and 13B show the mixed signals received at the first and second microphones 13 and 14, respectively. FIGS. 13C and 13D show the signal wave forms of the male speaker's speech "Sangyo-gijutsu-kenkyuka" and the female speaker's speech "Shin-iizuka" respectively, which were recovered according to the present method by use of the criteria in Equation (29). FIGS. 13E and 13F show the signal wave forms of the speech "Sangyo-gijutsu-kenkyuka" and "Shin-iizuka" respectively, which were obtained by use of the conventional method (FastICA).

FIGS. 13C and 13D show that speech duration of the two speakers differ from each other, and the permutation is visually nonexistent in the present method. On the other hand, FIGS. 13E and 13F show that the speech duration is nearly the same between the two words in the conventional method, thereby making it difficult to identify the speakers (i.e. which one of FIGS. 13E and 13F corresponds to "Sangyo-gijutsu-kenkyuka" or "Shin-iizuka").

While the invention has been so described, the present invention is not limited to the aforesaid embodiments and can be modified variously without departing from the spirit and scope of the invention, and may be applied to cases in which the method for recovering target speech based on split spectra using sound sources' locational information according to the present invention is structured by combining part or entirety of each of the aforesaid embodiments and/or its modifications. For example, in the present invention, the logic was developed by formulating a priori information on the sound sources' locations in terms of gains, but it is also possible to utilize a priori information on positions, directions and intensities as well as on variable gains and phase information that depend on microphone's directional characteristics. These prerequisites can be weighted differently. Although determination of the permutation was carried out for the split spectra in time series for the sake of easing visual inspection, in case where the noise is a sound impact (e.g. shutting a door), it is preferable to use the split spectra in their original form in determining the permutation.

According to the method for recovering target speech based on split spectra using sound sources' locational information set forth in claims 1–5, it is possible to eliminate the amplitude ambiguity and permutation, thereby recovering the target speech with high clarity.

Especially, according to the method set forth in claim 2, it is possible to prevent the amplitude ambiguity and permutation, thereby improving accuracy and clarity of the recovered speech.

According to the method set forth in claim 3, it is possible to rigorously determine the permutation occurrence for each component by use of simple determination criteria, thereby improving accuracy and clarity of the recovered speech.

According to the method set forth in claim 4, it becomes easy to visually check the validity of results of the permutation determination process.

According to the method set forth in claim 5, meaningful separated signals can be easily selected for recovery, and the target speech recovery becomes possible even when the target speech signal is weak in the mixed signals.

According to the method set forth in claims 6–10, a split spectrum corresponding to the target speech is highly likely to be outputted in the separated signal $U_A$, and thus it is possible to recover the target speech without using a priori information on the locations of the target speech and noise sources.

Especially, according to the method set forth in claim 7, the permutation occurrence becomes unlikely if the one sound source that is closer to the first microphone than to the second microphone is the target speech source, and it is likely, if the other sound source is the target speech source. Base on this information, it becomes possible to extract recovered spectrum group corresponding to the target speech by examining the likelihood of permutation occurrence. As a result, it is possible to prevent the permutation occurrence and amplitude ambiguity, thereby improving accuracy and clarity of the recovered speech.

According to the method set forth in claim 8, it is possible to rigorously determine the permutation occurrence for each component by use of simple determination criteria, thereby improving accuracy and clarity of the recovered speech.

According to the method set forth in claim 9, it becomes easy to visually check the validity of results of the permutation determination process. According to the method set forth in claim 10, the permutation occurrence becomes unlikely if the one sound source that is closer to the first microphone than to the second microphone is the target speech source, and it is likely if the other sound source is the target speech source. Based on this information, it becomes possible to extract recovered spectrum group corresponding to the target speech by examining the likelihood of the permutation occurrence. As a result, meaningful separated signals can be easily selected for recovery, and the target speech recovery becomes possible even when the target speech signal is weak in the mixed signals.

What is claimed is:

1. A method for recovering target speech based on split spectra using sound sources' locational information, said method comprising:

a first step of receiving target speech from a target speech source and noise from a noise source and forming mixed signals of the target speech and the noise at a first microphone and at a second microphone, said microphones being provided at different locations;

a second step of performing the Fourier transform of the mixed signals from a time domain to a frequency domain, decomposing the mixed signals into two separated signals $U_A$ and $U_B$ by use of the Independent Component Analysis, and, based on transfer functions of the four different paths from the target speech source and the noise source to the first and second microphones, generating from the separated signal $U_A$ a pair of split spectra $v_{A1}$ and $v_{A2}$, which were received at the first and second microphones respectively, and from the separated signal $U_B$ another pair of split spectra $v_{B1}$ and $v_{B2}$, which were received at the first and second microphones respectively;

a third step of extracting a recovered spectrum of the target speech, wherein the split spectra are analyzed by applying criteria based on sound transmission characteristics among the first and second microphones and the target speech and noise sources; and a fourth step of recovering the target speech by performing inverse Fourier transform of the recovered spectrum from the frequency domain to the time domain, wherein because a difference in gain or phase of said transfer function from said target speech source to said first and second microphones, or a difference in gain or phase of said transfer function from said noise source to said first and second microphones, are equivalent to a difference between said spectra $v_{A1}$ and $v_{A2}$ or a difference between said spectra $v_{B1}$ and $v_{B2}$, said criteria then becomes a determination of which signals received at said first and second microphones from said target speech source and said noise source correspond respectively to said spectra $v_{A1}$, $v_{A2}$, $v_{B2}$, in order to extract said recovered spectrum.

2. The method set forth in claim 1 wherein if the target speech source is closer to the first microphone than to the second microphone and the noise source is closer to the second microphone than to the first microphone, (i) a difference $D_A$ between the split spectra $v_{A1}$ and $v_{A2}$ and a difference $D_B$ between the split spectra $v_{B1}$ and $v_{B2}$ are calculated, and (ii) the criteria for extracting a recovered spectrum of the target speech comprise:

(1) if the difference $D_A$ is positive and if the difference $D_B$ is negative, the split spectrum $v_{A1}$ is extracted as the recovered spectrum of the target speech; or (2) if the difference $D_A$ is negative and if the difference $D_B$ is positive, the split spectrum $v_{B1}$ is extracted as the recovered spectrum of the target speech.

3. The method set forth in claim 2 wherein the difference $D_A$ is a difference between absolute values of the split spectra $v_{A1}$ and $v_{A2}$, and the difference $D_B$ is a difference between absolute values of the split spectra $v_{B1}$ and $v_{B2}$.

4. The method set forth in claim 2 wherein the difference $D_A$ is a difference between the split spectrum $v_{A1}$'s mean square intensity $P_{A1}$ and the split spectrum $v_{A2}$'s mean square intensity $P_{A2}$, and the difference $D_B$ is a difference between the split spectrum $v_{B1}$'s mean square intensity $P_{B1}$ and the split spectrum $v_{B2}$'s mean square intensity $P_{B2}$.

5. The method set forth in claim 1 wherein if the target speech source is closer to the first microphone than to the second microphone and the noise source is closer to the second microphone than to the first microphone, (i) mean square intensities $P_{A1}$, $P_{A2}$, $P_{B1}$ and $P_{B2}$ of the split spectra $v_{A1}$, $v_{A2}$, $v_{B1}$ and $v_{B2}$, respectively, are calculated, (ii) a difference $D_A$ between the mean square intensities $P_{A1}$ and $P_{A2}$, and a difference $D_B$ between the mean square intensities $P_{B1}$ and $P_{B2}$ are calculated, and (iii) the criteria for extracting a recovered spectrum of the target speech comprise:

(1) if $P_{A1}+P_{A2}>P_{B1}+P_{B2}$ and if the difference $D_A$ is positive, the split spectrum $v_{A1}$ is extracted as the recovered spectrum of the target speech;

(2) if $P_{A1}+P_{A2}>P_{B1}+P_{B2}$ and if the difference $D_A$ is negative, the split spectrum $v_{B1}$ is extracted as the recovered spectrum of the target speech;

(3) if $P_{A1}+P_{A2}<P_{B1}+P_{B2}$ and if the difference $D_B$ is negative, the split spectrum $v_{A1}$ is extracted as the recovered spectrum of the target speech; or (4) if $P_{A1}+P_{A2}<P_{B1}+P_{B2}$ and if the difference $D_B$ is positive, the split spectrum $v_{B1}$ is extracted as the recovered spectrum of the target speech.

6. A method for recovering target speech based on split spectra using sound sources' locational information, said method comprising:

a first step of receiving target speech from a sound source and noise from another sound source and forming mixed signals of the target speech and the noise at a first microphone and at a second microphone, said microphones being provided at different locations;

a second step of performing the Fourier transform of the mixed signals from a time domain to a frequency domain, decomposing the mixed signals into two separated signals $U_A$ and $U_B$ by use of the FastICA, and, based on transmission path characteristics of the four different paths from the two sound sources to the first and second microphones, generating from the separated signal $U_A$ a pair of split spectra $v_{A1}$ and $v_{A2}$, which were received at the first and second microphones respectively, and from the separated signal $U_B$ another pair of split spectra $v_{B1}$ and $v_{B2}$, which were received at the first and second microphones respectively;

a third step of extracting estimated spectra corresponding to the respective sound sources to generate a recovered spectrum group of the target speech, wherein the split spectra are analyzed by applying criteria based on those split spectra's equivalence to signals received at said first and second microphones; and a fourth step of recovering the target speech by performing inverse Fourier transform of the recovered spectrum group from the frequency domain to the time domain, wherein because a difference in gain or phase of a transfer function from one sound source to said first and second microphones, are equivalent to a difference between said spectra $v_{A1}$ and $v_{A2}$ or a difference between said spectra $v_{B1}$ and $v_{B2}$, said criteria then becomes a determination of which signals received at said first and second microphones from said 2 sound sources correspond respectively to said spectra vA1, vA2, vB1 and vB2, in order to extract said recovered spectrum.

7. The method set forth in claim 6 wherein if one of the two sound sources is closer to the first microphone than to the second microphone and the other sound source is closer to the second microphone than to the first microphone, (i) a difference $D_A$ between the split spectra $v_{A1}$ and $v_{A2}$ and a difference $D_B$ between the split spectra $v_{B1}$ and $v_{B2}$ for each frequency are calculated, (ii) the criteria comprise:

(1) if the difference $D_A$ is positive and if the difference $D_B$ is negative, the split spectrum $v_{A1}$ is extracted as an estimated spectrum $y_1$ for the one sound source, or (2) if the difference $D_A$ is negative and if the difference $D_B$ is positive, the split spectrum $v_{B1}$ is extracted as an estimated spectrum $y_1$ for the one sound source, to form an estimated spectrum group $Y_1$ for the one sound source, which includes the estimated spectrum $y_1$ as a component; and (3) if the difference $D_A$ is negative and if the difference $D_B$ is positive, the split spectrum $v_{A2}$ is extracted as an estimated spectrum $y_2$ for the other sound source, or (4) if the difference $D_A$ is positive and if the difference $D_B$ is negative, the split spectrum $v_{B2}$ is extracted as an estimated spectrum $y_2$ for the other sound source, to form an estimated spectrum group $Y_2$ for the other sound source, which includes the estimated spectrum $y_2$ as a component, (iii) the number of occurrences $N^+$ when the difference $D_A$ is positive and the difference $D_B$ is negative, and the number of occurrences $N^-$ when the difference $D_A$ is negative and the difference $D_B$ is positive are counted over all the frequencies, and (iv) the criteria further comprise:

(a) if $N^+$ is greater than $N^-$, the estimated spectrum group $Y_1$ is selected as the recovered spectrum group of the target speech; or (b) if $N^-$ is greater than $N^+$, the estimated spectrum group $Y_2$ is selected as the recovered spectrum group of the target speech.

8. The method set forth in claim 7 wherein the difference $D_A$ is a difference between absolute values of the split spectra $v_{A1}$ and $v_{A2}$, and the difference $D_B$ is a difference between absolute values of the split spectra $v_{B1}$ and $v_{B2}$.

9. The method set forth in claim 7 wherein the difference $D_A$ is a difference between the split spectrum $v_{A1}$'s mean square intensity $P_{A1}$ and the split spectrum $v_{A2}$'s mean square intensity $P_{A2}$, and the difference $D_B$ is a difference between the split spectrum $v_{B1}$'s mean square intensity $P_{B1}$ and the split spectrum $v_{B2}$'s mean square intensity $P_{B2}$.

10. The method set forth in claim 6 wherein if one of the two sound sources is closer to the first microphone than to the second microphone and the other sound source is closer to the second microphone than to the first microphone, (i) mean square intensities $P_{A1}$, $P_{A2}$, $P_{B1}$ and $P_{B2}$ of the split spectra $v_{A1}$, $v_{A2}$, $v_{B1}$ and $v_{B2}$, respectively, are calculated for each frequency, (ii) a difference $D_A$ between the mean square intensities $P_{A1}$ and $P_{A2}$, and a difference $D_B$ between the mean square intensities $P_{B1}$ and $P_{B2}$ are calculated, (iii) the criteria comprise:

(A) if $P_{A1}+P_{A2}>P_{B1}+P_{B2}$, (1) if the difference $D_A$ is positive, the split spectrum $v_{A1}$ is extracted as an estimated spectrum $y_1$ for the one sound source, or (2) if the difference $D_A$ is negative, the split spectrum $v_{B1}$ is extracted as an estimated spectrum $y_1$ for the one sound source, to form an estimated spectrum group $Y_1$ for the one sound source, which includes the estimated spectrum $y_1$ as a component, and (3) if the difference $D_A$ is negative, the split spectrum $v_{A2}$ is extracted as an estimated spectrum $y_2$ for the other sound source, or (4) if the difference $D_A$ is positive, the split spectrum $v_{B2}$ is extracted as an estimated spectrum $y_2$ for the other sound source, to form an estimated spectrum group $Y_2$ for the other sound source, which includes the estimated spectrum $y_2$ as a component; or (B) if $P_{A1}+P_{A2}<P_{B1}+P_{B2}$, (5) if the difference $D_B$ is negative, the split spectrum $v_{A1}$ is extracted as an estimated spectrum $y_1$ for the one sound source, or (6) if the difference $D_B$ is positive, the split spectrum $v_{B1}$ is extracted as an estimated spectrum $y_1$ for the one sound source, to form an estimated spectrum group $Y_1$ for the one sound source, which includes the estimated spectrum $y_1$ as a component, and (7) if the difference $D_B$ is positive, the split spectrum $v_{A2}$ is extracted as an estimated spectrum $y_2$ for the other sound source, or (8) if the difference $D_B$ is negative, the split spectrum $v_{B2}$ is extracted as an estimated spectrum $y_2$ for the other sound source, to form an estimated spectrum group $Y_2$ for the other sound source, which includes the estimated spectrum $y_2$ as a component, (iv) the number of occurrences $N^+$ when the difference $D_A$ is positive and the difference $D_B$ is negative, and the number of occurrences $N^-$ when the difference $D_A$ is negative and the difference $D_B$ is positive are counted over all the frequencies, and (v) the criteria further comprise:

(a) if $N^+$ is greater than $N^-$, the estimated spectrum group $Y_1$ is selected as the recovered spectrum group of the target speech; or (b) if $N^-$ is greater than $N^+$, the estimated spectrum group $Y_2$ is selected as the recovered spectrum group of the target speech.

* * * * *